US012647889B2

(12) United States Patent
Ahn et al.

(10) Patent No.: US 12,647,889 B2
(45) Date of Patent: Jun. 2, 2026

(54) WIRELESS COMMUNICATION METHOD AND WIRELESS COMMUNICATION TERMINAL USING WAKE-UP RADIO

(71) Applicant: WILUS INSTITUTE OF STANDARDS AND TECHNOLOGY INC., Gyeonggi-do (KR)

(72) Inventors: Woojin Ahn, Gyeonggi-do (KR);
Juhyung Son, Gyeonggi-do (KR);
Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/234,802

(22) Filed: Aug. 16, 2023

(65) Prior Publication Data

US 2023/0397108 A1      Dec. 7, 2023

Related U.S. Application Data

(63) Continuation of application No. 16/512,324, filed on Jul. 15, 2019, now Pat. No. 11,765,657, which is a
(Continued)

(30) Foreign Application Priority Data

Jan. 16, 2017      (KR) ........................ 10-2017-0007158
May 2, 2017      (KR) ........................ 10-2017-0055994

(51) Int. Cl.
H04W 52/02      (2009.01)
H04L 27/00      (2006.01)
H04W 84/12      (2009.01)
(52) U.S. Cl.
CPC ..... H04W 52/0229 (2013.01); H04L 27/0008 (2013.01); H04W 52/0219 (2013.01); H04W 84/12 (2013.01)

(58) Field of Classification Search
CPC ......... H04W 52/0229; H04W 52/0219; H04W 84/12; H04W 52/02; H04W 52/0235;
(Continued)

(56) References Cited

U.S. PATENT DOCUMENTS 9,191,891 B2      11/2015 Jafarian et al.
2011/0223913 A1      9/2011 Kho et al.
(Continued)

FOREIGN PATENT DOCUMENTS

KR      2003-0044688      6/2003
KR      10-2010-0034392      4/2010
WO      2018/131991      7/2018

OTHER PUBLICATIONS

Notice of Allowance dated Sep. 27, 2023 for Korean Patent Application No. 10-2022-7035923 and its English translation provided by Applicant's foreign counsel.
(Continued)

*Primary Examiner* — Sun Jong Kim
(74) *Attorney, Agent, or Firm* — WOMBLE BOND DICKINSON (US) LLP

(57) ABSTRACT

A wireless communication terminal communicating wirelessly with a base wireless communication terminal comprises a processor configured to receive a trigger frame for switching an operation mode from a first operation mode to a second operation mode from the base wireless communication terminal, wherein the wireless communication terminal receives only a PPDU which has a predetermined format and is transmitted by a predetermined modulation method in the first operation mode, and receives a PPDU other than the PPDU which has the predetermined format and is transmitted by the predetermined modulation method in the second operation mode, transmit an initial frame in response to the trigger frame in the second operation mode, and determine
(Continued)

whether to switch back to the first operation mode based on receiving a subsequent frame subsequent to the initial frame within a timeout interval.

10 Claims, 13 Drawing Sheets

Related U.S. Application Data continuation of application No. PCT/KR2018/000766, filed on Jan. 16, 2018.

(58) Field of Classification Search
CPC . H04W 52/0216; H04L 27/0008; Y02D 30/70
See application file for complete search history.

(56) References Cited

U.S. PATENT DOCUMENTS

| | | | |
|---|---|---|---|
| 2014/0098725 A1 | 4/2014 | Yucek et al. | |
| 2014/0126442 A1 | 5/2014 | Jafarian et al. | |
| 2015/0334650 A1 | 11/2015 | Park | |
| 2016/0081106 A1* | 3/2016 | Zhou | H04W 24/10 |
| | | | 370/328 |
| 2016/0381636 A1 | 12/2016 | Park et al. | |
| 2016/0381638 A1* | 12/2016 | Min | H04W 52/0235 |
| | | | 370/311 |
| 2017/0041959 A1* | 2/2017 | Itagaki | H04W 24/08 |
| 2018/0041961 A1* | 2/2018 | Huang | H04W 52/0216 |
| 2019/0223220 A1* | 7/2019 | Choi | H04W 84/12 |
| 2019/0253969 A1 | 8/2019 | Park et al. | |
| 2019/0253972 A1* | 8/2019 | Park | H04W 52/0235 |
| 2019/0320388 A1 | 10/2019 | Li et al. | |
| 2019/0349857 A1 | 11/2019 | Kim et al. | |
| 2020/0015166 A1 | 1/2020 | Ahn et al. | |

OTHER PUBLICATIONS

International Search Report for PCT/KR2018/000766 mailed on May 14, 2018 and its English translation from WIPO (now published as WO 2018/131991).

Written Opinion of the International Searching Authority for PCT/KR2018/000766 mailed on May 14, 2018 and its English translation by Google Translate (now published as WO 2018/131991).

Kim, Igor et al., "AP Discovery Using WUR", IEEE 802.11-16/1501r0, Nov. 8, 2016. See slides 2-8.

Ryu, Kiseon et al., "Overall MAC Procedure for WUR", IEEE 802.11-16/1445r1, Nov. 8, 2016. See slides 2-8.

Chu, Liwen, "WUR MAC Consideration", IEEE 802.11-16/1460r0, Nov. 8, 2016. See slides 3-5.

Liu, Jianhan et al., "On Waking-Up Multiple WUR Stations", IEEE P802.11-17/0028r0, Jan. 15, 2017. See slides 3-4.

Notice of Allowance dated Jul. 14, 2022 for Korean Patent Application No. 10-2019-7023761 and its English translation provided by Applicant's foreign counsel.

Office Action dated Jan. 26, 2022 for Korean Patent Application No. 10-2019-7023761 and its English translation provided by Applicant's foreign counsel.

Office Action dated Jul. 10, 2021 for Korean Patent Application No. 10-2019-7023761 and its English translation provided by Applicant's foreign counsel.

Minyoung Park et al.: "LP-WUR (Low-Power Wake-up Receiver" Follow up, IEEE 802.11-16/0341r0, Mar. 2016, slides 1-9.

U.S. Appl. No. 62/431,832, filed Dec. 9, 2016.

Notice of Allowance dated May 3, 2023 for U.S. Appl. No. 16/512,324 (now published as U.S. 2020/0015166).

Advisory Action dated Jan. 23, 2023 for U.S. Appl. No. 16/512,324 (now published as U.S. 2020/0015166).

Final Office Action dated Sep. 29, 2022 for U.S. Appl. No. 16/512,324 (now published as U.S. 2020/0015166).

Office Action dated May 20, 2022 for U.S. Appl. No. 16/512,324 (now published as U.S. 2020/0015166).

Advisory Action dated Feb. 16, 2022 for U.S. Appl. No. 16/512,324 (now published as U.S. 2020/0015166).

Final Office Action dated Oct. 1, 2021 for U.S. Appl. No. 16/512,324 (now published as U.S. 2020/0015166).

Office Action dated Mar. 3, 2021 for U.S. Appl. No. 16/512,324 (now published as U.S. 2020/0015166).

Restrictions Requirement dated Oct. 28, 2020 for U.S. Appl. No. 16/512,324 (now published as U.S. 2020/0015166).

Office Action dated Dec. 11, 2024 for Korean Patent Application No. 10-2023-7045195 and its English translation provided by Applicant's foreign counsel.

Notice of Allowance dated Aug. 22, 2025 for Korean Patent Application No. 10-2023-7045195 and its English translation provided by Applicant's foreign counsel.

* cited by examiner

WIRELESS COMMUNICATION METHOD
AND WIRELESS COMMUNICATION
TERMINAL USING WAKE-UP RADIO

CROSS-REFERENCE TO RELATED
APPLICATIONS

This application is a continuation of U.S. patent application Ser. No. 16/512,324 filed on Jul. 15, 2019, which is a continuation of International Patent Application No. PCT/KR2018/000766 filed on Jan. 16, 2018, which claims the priority to Korean Patent Application No. 10-2017-0007158 filed in the Korean Intellectual Property Office on Jan. 16, 2017, and Korean Patent Application No. 10-2017-0055994 filed in the Korean Intellectual Property Office on May 2, 2017, the entire contents of which are incorporated herein by reference.

TECHNICAL FIELD

The present disclosure relates to a wireless communication method, and more particularly, a wireless communication method, and a wireless communication device using wake-up radio.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

In addition, while developing technology that increases the speed and efficiency of a wireless LAN simultaneously, in order to extend the battery life of mobile devices equipped with a wireless LAN and to equip devices operating based on a very limited power source such as a battery with a wireless LAN, it is necessary to develop an efficient wireless LAN power saving technique. The existing WLAN power saving techniques are methods of periodically entering devices into a sleep mode to reduce power, but in this case, as the power saving efficiency of the device increases, the device wakes-up in a longer period, so that communication with the device is further delayed. To solve this problem, it is necessary to study a power saving technique using a separate low-power wake-up radio.

DISCLOSURE OF THE INVENTION

Technical Problem

An object of the present disclosure is to provide a wireless communication terminal using a low power wake-up receiver in a wireless LAN environment.

Technical Solution

According to an embodiment of the present invention, a wireless communication terminal communicating wirelessly includes: a first wireless transceiver for transmitting and receiving a signal transmitted through a first modulation method; a second wireless receiver for receiving a signal transmitted through a second modulation method different from the first modulation method; and a processor. The processor may receive a wake-up packet from a base wireless communication terminal through the second wireless receiver, wake-up the first wireless transceiver based on the wake-up packet, and maintain the second wireless receiver in a state capable of receiving at least from a time point at which the wake-up packet is received until a time point an exchange of frames with the base wireless communication terminal for the first time through the first wireless transceiver.

The processor may transmit an awake frame to the base wireless communication terminal through the first wireless transceiver, and receive an awake response frame in response to the awake frame from the base wireless communication terminal through the first wireless transceiver, and maintain the second wireless receiver in a state capable of receiving at least from when the wake-up packet is received to a time point at which the awake response frame is received. In this case, the awake frame may indicate a frame to be transmitted through the first wireless transceiver at the first after the first wireless transceiver wakes-up.

The processor may receive the wake-up packet from the base wireless communication terminal during a predetermined on-duration from a start time point of a predetermined duty cycle period, through the second wireless receiver, and maintain the second wireless receiver in a state capable of receiving at least from when the wake-up packet is received to an earlier time among a time point at which the awake response frame is received and a time point at which the on-duration expires. In this case, the duty cycle period may indicate a period in which the wireless communication terminal turns on the second wireless receiver. The on-duration may indicate a duration of maintaining the second radio receiver turned on according to the duty cycle period in a state capable of receiving.

The processor may transmit the awake frame based on a time at which the second wireless receiver receives the wake-up packet and a time required for the wake-up of the first wireless transceiver.

The processor may receive a request frame requesting the awake frame from the base wireless communication terminal through the first wireless transceiver, transmit the awake frame in response to the request frame to the base wireless communication terminal through the first wireless transceiver, and maintain the second wireless receiver in a state capable of receiving at least from when the wake-up packet is received to a time point at which the awake frame is transmitted. In this case, the awake frame may indicate a frame transmitted through the first wireless transceiver at the first after the first wireless transceiver wakes-up.

The processor may receive a wake-up packet from the base wireless communication terminal during a predetermined on-duration from a start time point of a predetermined duty cycle period, through the second wireless receiver, and maintain the second wireless receiver in a state capable of receiving from at least when the at least one wake-up packet is received to an earlier time point among a time point at which the awake frame is transmitted and a time point at which the on-duration expires.

The processor may receive an awake response frame in response to the awake frame from the base wireless communication terminal, through the first wireless transceiver, and maintain the second wireless receiver in a state capable of receiving at least from when the at least wake-up packet is received to a time point at which the awake response frame is received.

The processor may maintain the first wireless transceiver in a state capable of transmitting and receiving at least for a predetermined time waiting for reception of the request frame from waking up based on the wake-up packet. In this case, the predetermined time waiting for reception of the request frame may be calculated based on a PCR transition delay required for the first wireless transceiver to be in a state capable of transmitting and receiving after receiving the wake-up packet. The wake-up packet may include information related to a wake-up of a plurality of wireless communication terminals including the wireless communication terminal.

The wake-up packet may trigger a wake-up of wireless transceiver, which performs transmission and reception through the first wireless modulation method, of a plurality of wireless communication terminals including the wireless communication terminal. The processor may calculate a predetermined time waiting for reception of the request frame based on maximum PCR transition delay information indicating the longest time among a PCR transition delay of each of the plurality of wireless communication terminals, and maintain the first wireless transceiver in a awake state at least for the predetermined time from when the wake-up packet is received. In this case, the PCR transition delay may indicate a time required for the first wireless transceiver to be in a state capable of transmitting and receiving after receiving the wake-up packet.

The wake-up packet may include a group identifier for identifying the plurality of wireless communication terminals. The maximum PCR transition delay may be determined for each group. The processor may obtain information indicating a maximum PCR transition delay based on the group identifier.

The wake-up packet may trigger a wake-up of a wireless transceiver, which performs transmission and reception through the first wireless modulation method, of each of a plurality of wireless communication terminals including the wireless communication terminal. The processor may receive a group response frame from the base wireless communication terminal through the first wireless transceiver, and maintain the second wireless receiver in a state capable of receiving from at least when the group wake-up packet is received to a time point at which the group response frame is received. In this case, the group response frame is a response frame in response to a frame transmitted from at least one of the plurality of wireless communication terminals to the base wireless communication terminal.

The wake-up packet may include a group identifier identifying the plurality of wireless communication terminals. The group response frame may include a group identifier field. The processor may receive the group response frame from the base wireless communication terminal based on the group identifier and the group identifier field of the group response frame, through the first wireless transceiver.

The wake-up packet may include subsequent operation information distinguished by each of the plurality of wireless communication terminals and a WUR identifier for identifying a wireless communication terminal triggered by the wake-up packet. The processor may determine whether to wake-up the first wireless transceiver based on the WUR identifier and the subsequent operation information, and wake-up the first wireless transceiver based on the determination.

The processor may obtain a WUR identifier allocated to the wireless communication terminal from the base wireless communication terminal, through the first wireless transceiver, determine wake-up of the first wireless transceiver by comparing the WUR identifier obtained through the first wireless transceiver with a WUR identifier included in the wake-up packet, and wake-up the first wireless transceiver based on the determination.

The processor may obtain information indicating at least one wireless communication terminal determined as a wireless communication terminal having an awake frame transmission role among a plurality of wireless communication terminals included in the group. The processor may obtain information indicating at least one wireless communication terminal determined as a wireless communication terminal having an awake frame transmission role among a plurality of wireless communication terminals included in the group, through the second wireless receiver. In this case, a wireless communication terminal having an awake frame transmission role may indicate a wireless communication terminal transmitting the awake frame to the base wireless communication terminal through the first wireless transceiver after the first wireless transceiver wakes-up.

The information indicating at least one wireless communication terminal determined as a wireless communication terminal having an awake frame transmission role among a plurality of wireless communication terminals included in the group may be bitmap information.

The bitmap information may be indicated through one bit allocated to each of the plurality of wireless communication terminals.

The processor may determine whether to transmit the awake frame based on information indicating at least one wireless communication terminal determined as a wireless communication terminal having the awake frame transmission role among the plurality of wireless communication terminals, and transmit the awake frame based on the determination.

The processor may maintain the first wireless transceiver in a state capable of transmitting and receiving from the wake-up time to the time point at which the awake response frame is received based on the wake-up inactivity information. In this case, the awake response frame may include wake-up inactivity information indicating that it is not necessary to maintain the first wireless transceiver of the wireless communication terminal in state capable of transmitting and receiving.

The awake response frame may include wake-up error information indicating that there is an error in the wake-up of the first wireless transceiver of the wireless communication terminal.

The processor may transmit a WUR negotiation request for requesting negotiation with the second wireless receiver to the base wireless communication terminal based on the wake-up error information through the first wireless transceiver. In this case, the WUR negotiation request may be a request for a response including a wake-up radio identifier that identifies the second wireless receiver allocated to the wireless communication terminal.

The processor may receive the wake-up packet from the base wireless communication terminal during a predetermined on-duration from a start time point of a predetermined duty cycle period through the second wireless receiver. In this case, the duty cycle period may indicate a period in which the wireless communication terminal turns on the second wireless receiver. The on-duration may indicate a duration of maintaining the second radio receiver turned on according to the duty cycle period in a state capable of receiving.

The processor may receive the wake-up packet from the base wireless communication terminal for a predetermined on-duration from a start time point of a predetermined duty cycle period, through the second wireless receiver, and maintain the second wireless receiver in a state capable of receiving from when receiving the wake-up packet to an earlier time point among a time point at which the awake response frame is received and a time point at which the on-duration expires.

The processor may receive a beacon during the on-duration from the base wireless communication terminal through the second wireless receiver. In this case, the beacon may include time synchronization information for time synchronization between the base wireless communication terminal and the wireless communication terminal. The processor may use the time synchronization information to determine a start time point of a duty cycle period in which the on-duration starts. The processor may maintain the second wireless receiver in a state capable of receiving during the on-duration from a time point at which the duty cycle period starts.

The processor may determine, based on the beacon reception, whether the location of the wireless communication terminal is within the coverage of the base wireless communication terminal.

The processor may receive information indicating the duty cycle period and the on-duration from the base wireless communication terminal through the first wireless transceiver.

The processor may receive mobility information indicating mobility of the base wireless communication terminal from the base wireless communication terminal through the first wireless transceiver. The mobility information may indicate whether the base wireless communication terminal is movable.

When the beacon is not received during the on-duration from a start time point of the duty cycle period through the second wireless receiver, the processor may wake-up the first wireless transceiver based on the mobility information. Here, if the mobility information indicates that the base wireless communication terminal is movable, the processor may maintain the first wireless transceiver in a doze state until the start time point of the next duty cycle period after the on-duration elapses. Here, when the mobility information indicates that the base wireless communication terminal is not movable, the processor may wake-up the first wireless transceiver.

According to an embodiment of the present invention, a base wireless communication terminal communicating wirelessly includes: a first wireless transceiver for transmitting and receiving a signal transmitted through a first modulation method; a second wireless transmitter for transmitting a signal through a second modulation method different from the first modulation method; and a processor.

The processor may transmit a first wake-up packet triggering wake-up of a wireless transceiver, which performs transmission and reception on a wireless communication terminal through the first modulation method, to the wireless communication terminal through the second wireless transmitter.

The processor may transmit a trigger frame requesting an awake frame to the wireless communication terminal through the first wireless transceiver. In this case, the awake frame may indicate a frame transmitted to the base wireless communication terminal through the first modulation method at the first after the wireless communication terminal transitions to a state capable of transmitting and receiving a frame through the first modulation method.

The processor may transmit the trigger frame based on a time point at which the first wake-up packet is transmitted and a PCR transition delay which is required until the wireless communication terminal transitions a wireless transceiver performing transmission and reception through the first modulation method into a state capable of transmitting and receiving after receiving the first wake-up packet.

The processor may receive information indicating the PCR transition delay from the wireless communication terminal through the first wireless transceiver in a link establishment procedure that establishing a link with the wireless communication terminal.

The first wake-up packet may trigger a wake-up of wireless transceivers, which transmits and receives through the first modulation method, of a plurality of wireless communication terminals including the wireless communication terminal. The processor may obtain information indicating a PCR transition delay of each of the plurality of wireless communication terminals from each of the plurality of wireless communication terminals through the first wireless transceiver, obtain maximum PCR transition delay information indicating a longest time among t PCR transition delay of each of the plurality of wireless communication terminals based on information indicating the PCR transition delay of each of the plurality of wireless communication terminals, and transmit the trigger frame to the plurality of wireless communication terminals based on the maximum PCR transition delay.

When receiving a response to the trigger frame from at least one of the plurality of wireless communication terminals through the first wireless transceiver, the processor may transmit a group response frame including a group identifier indicating the plurality of wireless communication terminals to the plurality of wireless communication terminals.

When an awake frame is not received from the wireless communication terminal within a predetermined time from when the first wake-up packet is transmitted, the processor may transmit a second wake-up packet to the wireless communication terminal through the second wireless transmitter. The predetermined time may be calculated based on a PCR transition delay required for the wireless communication terminal transitions a wireless transceiver performing transmission and reception through the first modulation method into a state capable of transmitting and receiving after receiving the first wake-up packet. The awake frame may indicate a frame transmitted to the base wireless communication terminal through the first modulation method at the first after the wireless communication terminal transitions a frame into a state capable of transmitting and receiving through the first modulation method.

The second wake-up packet may trigger wake-up of a wireless transceiver, which performs transmission and reception through the first modulation method, of at least one wireless communication terminal that is not triggered by the first wake-up packet.

Advantageous Effects

One embodiment of the present disclosure provides a wireless communication method using a wake-up radio and a wireless communication terminal using the same.

MODE FOR CARRYING OUT THE INVENTION

Terms used in this specification may be currently widely used general terms in consideration of functions in the present disclosure but may vary according to the intents of those skilled in the art, customs, or the advent of new technology. Additionally, in certain cases, there may be terms the applicant selects arbitrarily and in this case, their meanings are described in a corresponding description part of the present disclosure. Accordingly, terms used in this specification should be interpreted based on the substantial meanings of the terms and contents over the whole specification.

Throughout the specification, when a portion is referred to as being "connected" to another portion, it includes not only "directly connected" but also "electrically connected" with another element therebetween. Furthermore, when it is described that one comprises (or includes or has) some elements, it should be understood that it may comprise (or include or has) only those elements, or it may comprise (or include or have) other elements as well as those elements if there is no specific limitation. In addition, the limitations of "more than or equal to" or "less than or equal to" based on a certain threshold value may be appropriately replaced with "more than" or "less than", respectively.

This application claims priority based on Korean Patent Application Nos. 10-2017-0007158 (2017 Jan. 16) and 10-2017-0055994 (2017 May 2), and the embodiments and descriptions described in each of the above applications which are the basis of priority are to be included in the detailed description of the present application.

Figure 1:
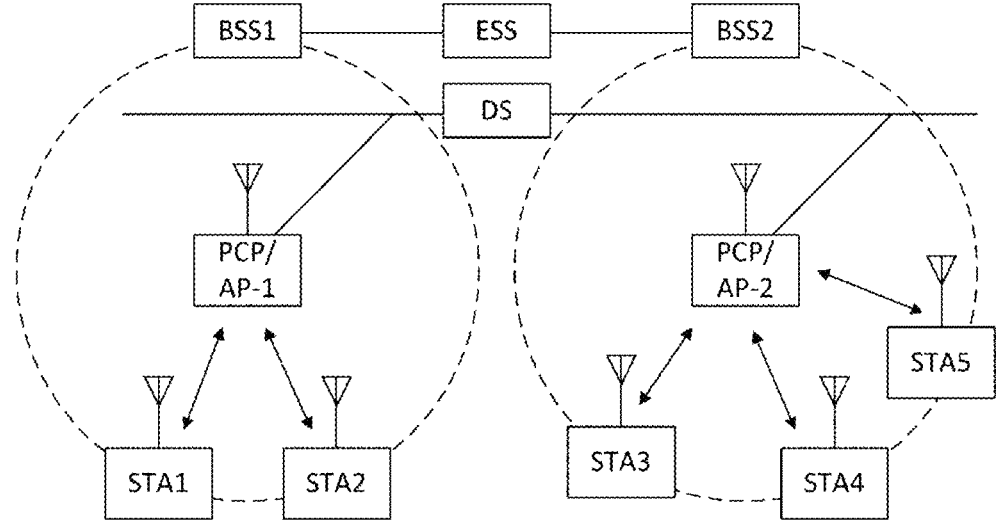
FIG. 1 shows a wireless LAN system according to an embodiment of the present disclosure.

FIG. 1 is a diagram illustrating a wireless communication system according to an embodiment of the present disclosure. For convenience of description, an embodiment of the present disclosure is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The reception of a frame or packet in the present disclosure may indicate a successful reception. For example, successful reception may mean reception determined as not failing through a frame check sequence (FCS) contained in a frame or packet.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present disclosure, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
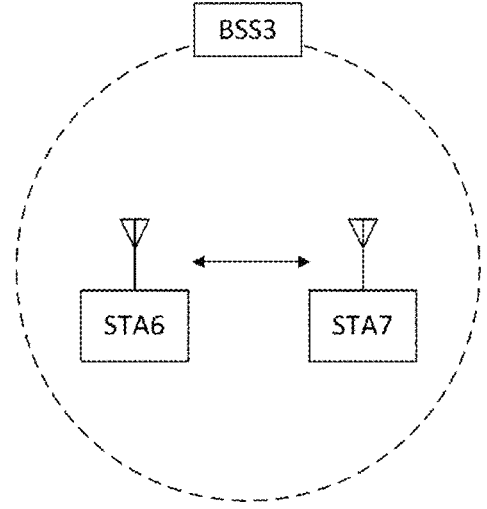
FIG. 2 shows a wireless LAN system according to another embodiment of the present disclosure.

FIG. 2 illustrates an independent BSS which is a wireless communication system according to another embodiment of the present disclosure. For convenience of description, another embodiment of the present disclosure is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
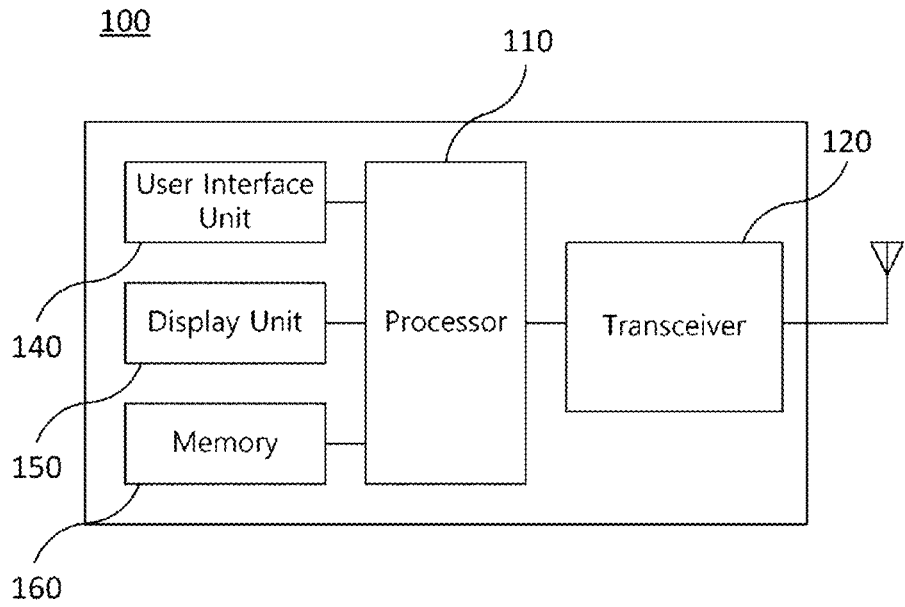
FIG. 3 shows a block diagram illustrating a configuration of a station according to an embodiment of the inventive concept.

FIG. 3 is a block diagram illustrating a configuration of a station 100 according to an embodiment of the present disclosure.

As illustrated in FIG. 3, the station 100 according to the embodiment of the present disclosure may include a processor 110, a network interface card (NIC) 120, a user interface unit 140, a display unit 150, and a memory 160.

First, the NIC 120 is a module for performing wireless LAN access, and performs packet transmission and packet reception for station 100. The NIC 120 may be embedded in the station 100 or provided as an exterior. The NIC 120 may include at least one network interface card module using different frequency bands. For example, the NIC 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The NIC 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present disclosure may execute various commands or programs and process data in the station 100. Further, the processor 110 may control the respective units of the station 100 and control data transmission/reception among the units. According to the embodiment of the present disclosure, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. A detailed embodiment thereof will be described below.

The station 100 illustrated in FIG. 3 is a block diagram according to an embodiment of the present disclosure, where separate blocks are illustrated as logically distinguished elements of the device. Accordingly, the elements of the device may be mounted in a single chip or multiple chips depending on design of the device. Further, in the embodiment of the present disclosure, some components of the station 100, for example, the user interface unit 140 and the display unit 150 may be optionally provided in the station 100.

Figure 4:
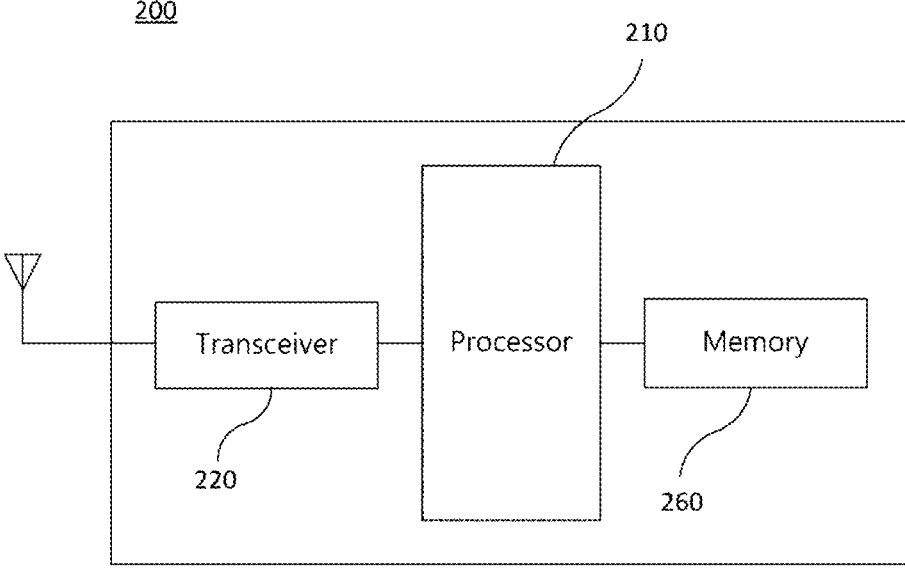
FIG. 4 shows a block diagram illustrating a configuration of an access point according to an embodiment of the present disclosure.

FIG. 4 is a block diagram illustrating a configuration of an AP 200 according to an embodiment of the present disclosure.

As illustrated in FIG. 4, the AP 200 according to the embodiment of the present disclosure may include a processor 210, a NIC 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present disclosure includes the NIC 220 for operating the BSS in at least one frequency band. As described in the embodiment of FIG. 3, the NIC 220 of the AP 200 may also include a plurality of transmit and receive modules using different frequency bands. That is, the AP 200 according to the embodiment of the present disclosure may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The NIC 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present disclosure, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. A detailed embodiment thereof will be described below.

Figure 5:
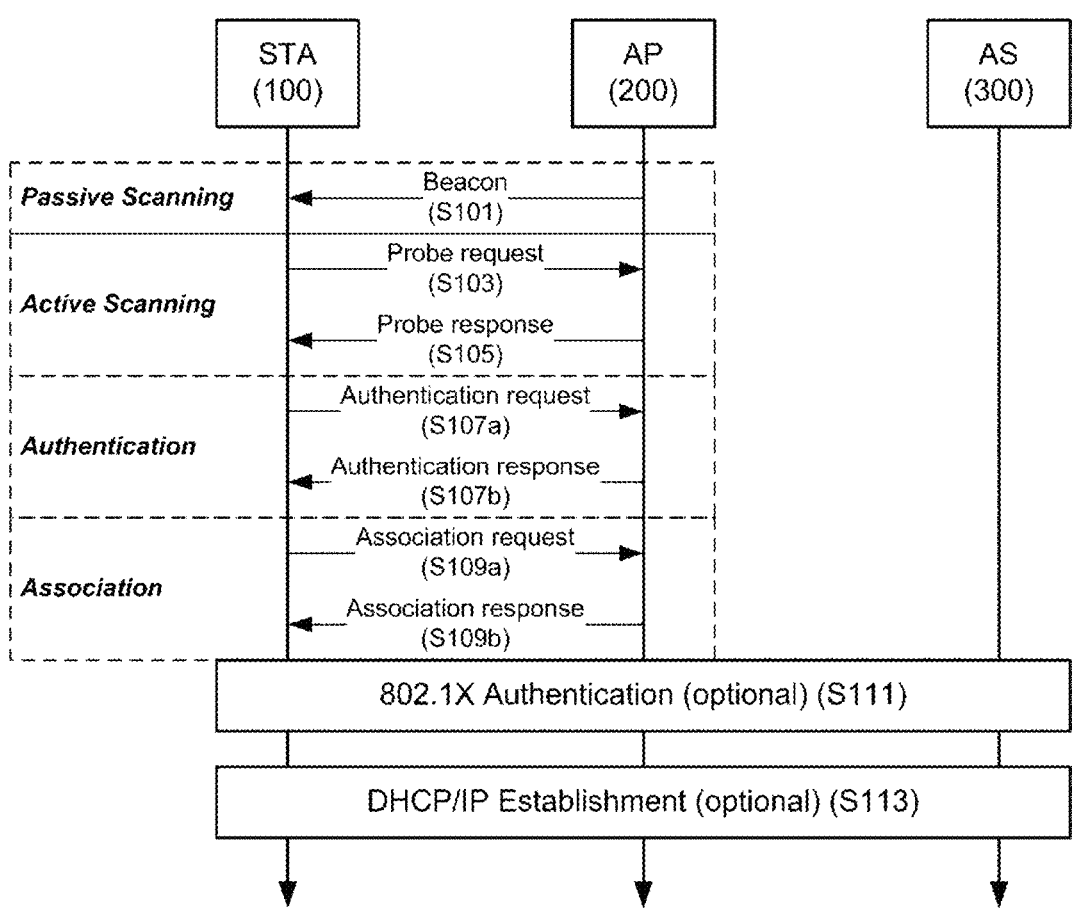
FIG. 5 shows a process that a station sets an access point and a link according to an embodiment of the present disclosure.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP.

A wireless communication terminal may operate in a power save mode for energy efficiency. A wireless communication terminal operating in the power save mode may enter a doze state when the wireless communication terminal does not perform any operation, and the wireless communication terminal may stop the doze state and enter an awake state to receive the radio signal from the external device. In this case, the doze state may indicate a state in which the wireless communication terminal cuts off power associated with a part of the functions of the wireless communication terminal to increase energy efficiency. Specifically, in the doze state, the wireless communication terminal may restrict the communication function. In the power save mode, it may be referred to as a wake-up that the wireless communication terminal transition from the doze state to the awake state. In the power save mode, the wireless communication terminal may periodically wake-up to receive a radio signal from an external device. This operation may lower the operation efficiency of the wireless communication terminal.

When the wireless communication terminal wakes-up according to a wake-up radio (WUR) that triggers a wake-up of the PCR transceiver, the operation efficiency of the wireless communication terminal may be improved. Specifically, when the wireless communication terminal wakes-up according to the WUR, unnecessary wake-up operations may be reduced. In addition, when WUR is used, the time during which the wireless communication terminal stays in the doze state may be increased, and the power efficiency of the wireless communication terminal may be increased. Therefore, the wireless communication terminal may include a wake-up receiver (WURx) which operates with a lower power than the transceiver that transmits and receives the general wireless LAN signal, and wake-up according to WUR in a power save mode in which a general wireless LAN signal transmission/reception function is suspended. For convenience of description, in the present disclosure, a power save operation with the WUR signal is referred to as a WUR-based power save operation.

In this case, the general wireless LAN signal may be referred to as a primarily connected radio (hereinafter, referred to as 'PCR') signal differentiated from the WUR signal. A part of the WUR signal may be transmitted in a different modulation method from the modulation of the PCR signal. For example, a part of the WUR signal may be transmitted by using On-Off Keying (OOK). Specifically, the PCR transceiver may transmit and receive modulated signals through a wave-form modulation method using the WURx and other wave forms.

Hereinafter, an operation of a wireless communication terminal including a WURx and a wireless communication method using WUR according to an embodiment of the present disclosure will be described with reference to FIGS. 6 to 18.

Figure 6:
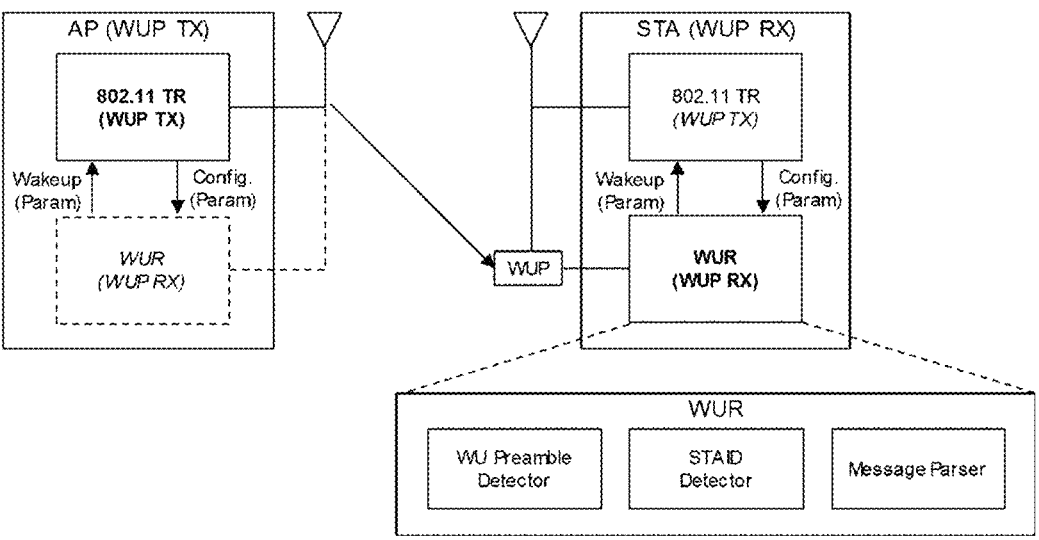
FIGS. 6 and 7 are diagrams illustrating a network including wireless communication terminals supporting the WUR-based power save according to an embodiment of the present disclosure.
Figure 7:
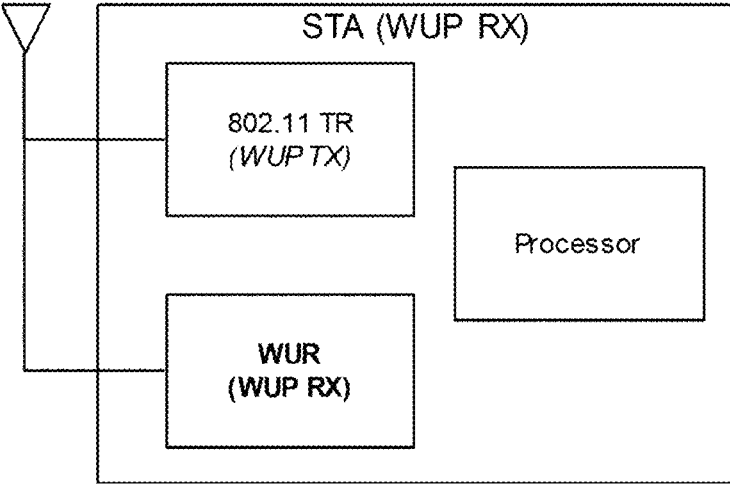

FIGS. 6 and 7 are diagrams illustrating a network including wireless communication terminals supporting the WUR-based power save. Referring to FIG. 6, the network may include an AP and a station supporting the WUR-based power save. Meanwhile, the AP and the station of FIG. 6 may include a PCR transmission/reception function of 802.11a/b/g/n/ac/ax, which is a general wireless LAN standard. In addition, the AP and the station in FIG. 6 may coexist in one network and a general station that supports only PCR transmission/reception without supporting WUR transmission/reception. For example, the network of FIG. 6 may include the general station that does not support a WUR function.

According to an embodiment, an AP may include a first wireless transceiver (TR) supporting a communication method using PCR. The first wireless transceiver may transmit and receive packet through PCR. The AP may include a second wireless transmitter that transmits frames through WUR. The second wireless transmitter may be referred to as a wake-up transmitter (WUTx). Here, the WUR signal may be a signal transmitted in a second modulation method different from the first modulation method used in the PCR signal. Specifically, a part of the WUR signal may be transmitted by using OOK. For example, the second wireless transmitter may transmit a wake-up packet to the station through the WUR. Also, if the AP additionally includes the WURx, the AP may receive a wake-up packet from the outside through the WURx.

Meanwhile, according to another embodiment, the first wireless transceiver and the second wireless transmitter may be implemented as one transceiver. For example, an AP may perform transmission and reception of a PCR signal and transmission of a WUR signal through one transceiver.

As shown in FIG. 6, the AP may transmit a wake-up packet that triggers a wake-up of the PCR transceiver of a station to the station that supports the WUR-based power save.

According to an embodiment, a station supporting the WUR-based power save may include a WURx for receiving a wake-up packet. The station may include a first wireless transceiver that supports PCR transmission and reception and a WURx, that is, a second wireless receiver that exists separately. Here, the first wireless transceiver may be referred to as a PCR transceiver. The wireless communication terminal may transmit and receive PCR signals using a PCR transceiver. Also, the second wireless receiver may receive a signal transmitted in a second modulation method different from the first modulation method of the signal transmitted/received through the first wireless transceiver.

The WURx may receive a wake-up packet from the AP and wake-up the PCR transceiver. If the WURx receives a wake-up packet while the PCR transceiver of the station operates in the doze state, the WURx may wake-up the PCR transceiver by using an internal wake-up signal.

For example, the station may have an interface between the PCR transceiver and the WURx. At this point, the WURx may wake-up the PCR transceiver of the station by using the internal interface. Specifically, the WURx may wake-up a PCR transceiver by transmitting an internal signal to the PCR transceiver, but it is not limited thereto. For example, as described in FIG. 7, the station may have a processor that controls the overall operation of the station. At this point, the WURx may wake-up the PCR transceiver over the processor. Specifically, the station may cut off the power supply of the PCR and the processor in the PCR doze state. In this case, the WURx may operate in a manner that stops cutting off the power supply of the processor and wakes-up the PCR transceiver over the processor by receiving a wake-up packet.

According to an embodiment, the WURx may deliver information received through the wake-up packet to the PCR transceiver. The WURx may transmit information on subsequent operations following the wake-up to the PCR transceiver by using the internal interface. Specifically, the information on the subsequent operations may be a Sequence ID (SID) that identifies each of the subsequent operations. In addition, PCR may set WURx parameters required for the WUR based power save operation by using the internal interface.

the WURx may include a wake-up preamble detector (WU Preamble Detector), a wireless communication terminal identifier detector (STA ID Detector), and a message parser. The WU preamble detector detects a wake-up packet by identifying a sequence of signal patterns included in the wake-up packet. In addition, the WU preamble detector may perform automatic gain control (AGC) and synchronization on WUR based on the detected signal pattern sequence.

The STA ID Detector detects a recipient of the wake-up packet. In this case, the STA ID Detector may obtain information for identifying the receiver of the wake-up packet based on the preamble of the wake-up packet. In addition, the STA ID Detector may obtain information for identifying the receiver of the wake-up packet based on the wake-up (WU) signaling field of the wake-up packet. In addition, the STA ID Detector may obtain information for identifying the receiver of the wake-up packet based on the preamble and the WU signaling field of the wake-up packet.

The WU signaling field of the wake-up packet may signal information related to the wake-up indicated by the wake-up packet.

The message parser parses the message that the wake-up packet contains. Specifically, the message parser may parse the message contained in the wake-up packet to obtain the message indicated by the wake-up packet.

According to one embodiment, the station may determine a condition for maintaining WURx to be available for reception. For example, until the time point at which the station recognizes that the wake-up of the PCR transceiver of the station is successful, the station may may maintain WURx to be available for transmission and reception. This will be described in detail with reference to FIG. 9 to be described later.

Figure 8:
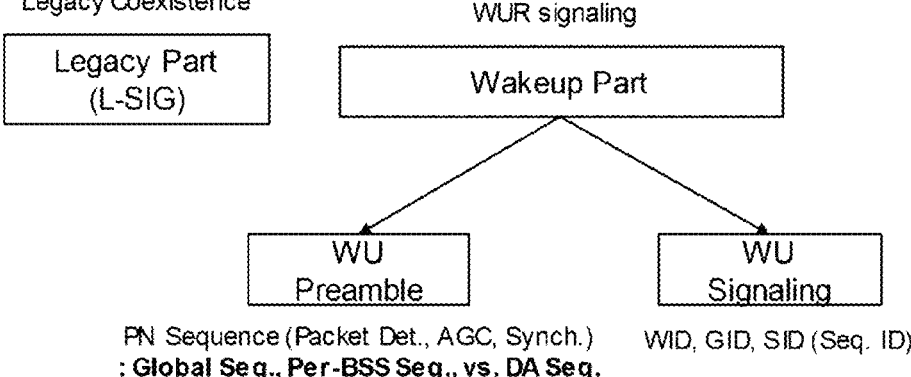
FIG. 8 is a diagram illustrating a format of a wake-up packet according to an embodiment of the present disclosure.

FIG. 8 is a diagram illustrating a format of a wake-up packet according to an embodiment of the present disclosure.

A wake-up packet may include a legacy part that may be demodulated by a PCR transceiver. Specifically, the wake-up frame may be divided into the legacy part and a wake-up part that cannot be demodulated by the PCR transceiver. As described above, the BSS may simultaneously include stations that supports the WUR-based power save and legacy stations that does not support the WUR-based power save. In this case, it is necessary that the operation of the stations supporting the WUR-based power save does not hinder the operation of the legacy stations belonging to the BSS.

Specifically, the legacy part may include a legacy preamble (L-Preamble) used in the existing 802.11 standard. Specifically, the legacy preamble may include an L-STF including a short training signal, an L-LTF including a long training signal, and an L-SIG including signaling information for the legacy wireless communication terminals. The legacy stations may determine the length of a wake-up packet using the L-SIG. Accordingly, the legacy stations may not access the frequency band in which the wake-up packet is transmitted while the wake-up packet is transmitted.

A station that supports the WUR-based power save may demodulate the wake-up part by using WURx. At this point, the wake-up part may include a wake-up preamble (WU preamble) and a wake-up signaling field (WU signaling field). The WU preamble may include a sequence of signal patterns indicating a wake-up packet. Specifically, an AP may insert a pseudo noise sequence based on modulation into the wake-up preamble. The AP may insert a pseudo-noise sequence by using OOK. The signal pattern sequence may be the pattern applied to the WU preamble identically regardless of which station receives the wake-up packet.

The station that supports the WUR-based power save may determine the recipient of a received wake-up packet by parsing the WU signaling part of the wake-up packet. Specifically, the WU signaling field may include a WUR identifier (WID) that identifies a station receiving the wake-up packet. The station may wake-up the PCR transceiver when it receives the wake-up packet containing the WID representing the station. The AP may allocate a different WID for each of a plurality of stations in order to wake-up the PCR transceiver of some specific station among the plurality of stations belonging to the BSS through the wake-up packet.

According to an embodiment, when a wake-up packet triggers a wake-up of a PCR transceiver of a plurality of stations, the wake-up signaling field of the wake-up packet includes a Group Identifier (GID). Here, the GID may include a group address (GA). In addition, an AP may insert subsequent operation information indicating the subsequent operation of the station to be waked-up into the wake-up signaling field. For example, the wake-up signaling field may additionally include a subsequent operation identifier (e.g., SID) that identifies subsequent operations after wake-up.

For convenience of explanation, unless specifically stated otherwise, stations and APs are assumed to be stations and APs that support the WUR-based power save.

Figure 9:
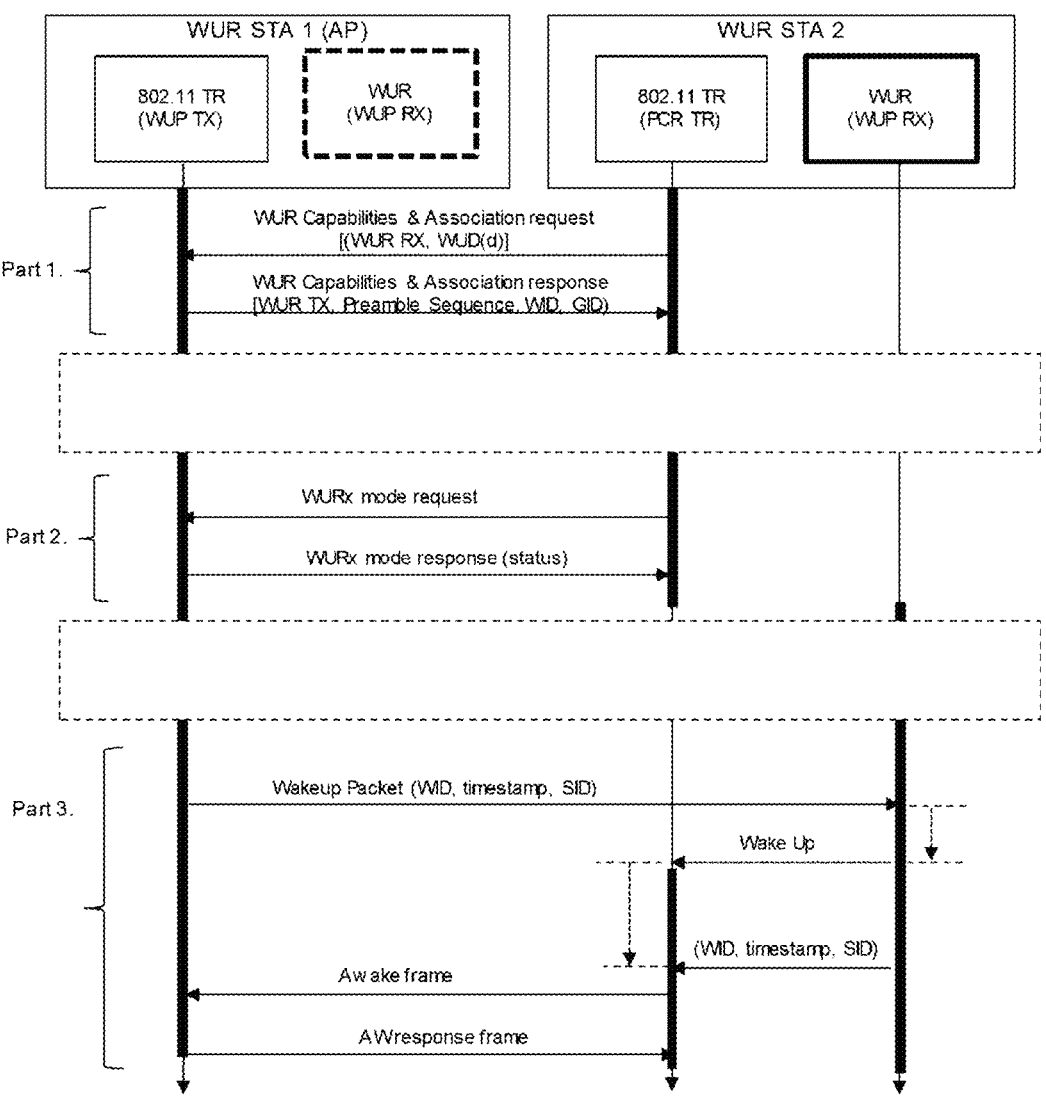
FIG. 9 is a diagram illustrating a method of operating a wireless communication terminal supporting WUR-based power save according to an embodiment of the present disclosure.

FIG. 9 is a diagram illustrating a method of operating a wireless communication terminal supporting the WUR-based power save according to an embodiment of the present disclosure.

According to an embodiment, a wireless communication terminal may perform WUR negotiation prior to the WUR-based operation. The wireless communication terminal may perform the WUR negotiation procedure using the PCR transceiver. In the WUR negotiation procedure, the wireless communication terminal may signal a WUR capability element. Alternatively, the wireless communication terminal may signal the WUR capability element through the WUR combining procedure separate from the WUR negotiation procedure. Here, the WUR capability element may include capabilities related to wake-up. Here, the capability related to the wake-up may include functions related to WUR, supported by the wireless communication terminal. The wireless communication terminal may be classified according to the functions related to WUR, supported by the wireless communication terminal. At this point, the wireless communication terminal may signal the classification of the wireless communication terminal according to the functions related to WUR, supported by the wireless communication terminal. For example, if a wireless communication terminal includes a WURx, the wireless communication terminal may signal that it is a wake-up enabled user equipment WUR Rx based on WUR. Alternatively, if a wireless communication terminal includes the function of transmitting a wake-up packet, the wireless communication terminal may be classified as an user equipment WUR Tx capable of transmitting a wake-up packet based on the WUR.

Further, according to an embodiment, the WUR capability element may include parameters related to the WUR capability. For example, the parameters related to the WUR capability may include a wake-up delay (WUD) indicating the time takes for the PCR transceiver of the wireless communication terminal to wake-up after the wireless communication terminal receives a wake-up packet. For example, when the wireless communication terminal includes a WURx, the wireless communication terminal may signal a wake-up delay required for wake-up of the PCR transceiver of the wireless communication terminal. The wake-up delay may be referred to as a PCR transition delay. The PCR transition delay may indicate the time that it takes for the PCR transceiver to transition to a state in which transmitting and receiving through PCR are capable after the wireless communication terminal receives a wake-up packet. Specifically, the PCR transition delay may include the time it takes for WURx to instruct the PCR transceiver to wake-up and to wake-up the PCR transceiver. For example, the PCR transition delay may include the time from receiving a wake-up packet through the WURx to transitioning the PCR transceiver from the doze state to the active state.

According to an embodiment, when a wireless communication terminal supports the WUR-based power save, the wireless communication terminal may signal the WUR mode element of the wireless communication terminal.

Here, the WUR mode element may include information required for a wireless communication terminal to perform WUR-based operations. The wireless communication terminal may signal the WUR mode element with the WUR capability element in the WUR negotiation procedure. Alternatively, the wireless communication terminal may signal the WUR mode element in a WUR association procedure separate from WUR negotiation procedure. If the wireless communication terminal signals the WUR mode element through the WUR association procedure, the wireless communication terminal may receive a WUR association request from a wireless communication terminal including a WURx. The wireless communication terminal may signal information required for the WUR-based operation in a WUR association response for the WUR association request. In this case, the WUR association request may be performed in the form of an action frame. The station may transmit the WUR association request with a WURx mode request transmitted in the process of entering a WURx mode, which will be described later. In this case, the AP may transmit the WUR association response with the WURx mode response for the WURx mode request.

For example, the WUR mode element may include at least one of a WID and a GID to be used in a wake-up packet. In addition, the WUR mode element may include a sequence of signal patterns to be used in a wake-up packet. The wireless communication terminal may signal the signal pattern sequence included in the wake-up preamble of the wake-up packet. When the signal pattern sequence is different for each BSS or different for each wireless communication terminal, the wireless communication terminal may signal a plurality of signal pattern sequences. In addition, the signal pattern sequence may be the signal pattern sequence described with reference to FIG. 8. In addition, the WUR mode element may include a group management element associated with the group wake-up operation of the wireless communication terminal. The group management element will be described in detail with reference to FIG. 11.

In FIG. 9, a WUR STA 1 represents a WUR station, which is an AP. Also, a WUR STA 2 represents a WUR station, which is not an AP. Referring to Part 1 of FIG. 9, a station WUR STA 2 including a WURx may perform a WUR association procedure and a WUR negotiation procedure with an AP WUR STA 1 for the WUR-based power save operation. According to an embodiment, the AP and the station may signal a WUR mode element and a WUR capability element through the PCR signal.

In FIG. 9, a station WUR STA 2 may transmit a request frame containing the WUR mode element and the WUR capability element to an AP WUR STA 1. In this case, the request frame may contain a classification WUR Rx of the station WUR STA 2 according to the functions relate to WUR and a time required for the station to wake-up WUD (d). The AP WUR STA 1 may receive a request frame from the station WUR STA 2 using a PCR transceiver. The AP WUR STA 1 transmits a response frame for the request frame to the station WUR WUR STA 2. At this point, the response frame may include a classification WUR Tx of AP WUR STA 1 according to the functions related to WUR, a signal pattern sequence Preamble Seq included in a WU preamble of a wake-up packet, SA for the wake-up packet, and DA for the wake-up packet. The station WUR STA 2 may obtain at least one the classification WUTx of the AP WUR STA 1, the signal pattern sequence Preamble Seq to be used for a wake-up frame, SA to be used for the wake-up frame, and DA to be used for the wake-up frame, using the PCR transceiver.

At least one of the above-described WUR negotiation procedure and association procedure may be performed together with the link establishment procedure between a station and a AP described with reference to FIG. 5. For example, in establishing the initial link between the AP and the station, a WUR capability element of the station may be signaled. Specifically, the station may signal the WUR capability element in a probe request frame in the process of performing the active scanning described above. Alternatively, the station may signal the WUR capability element in the association request frame in the association process described above. The AP may transmit a WUR capability element and a WUR mode element of the AP to the station in a probe response or association response frame, which is a response to the request frame transmitted from the station.

Hereinafter, a process of entering a WURx mode after the station WUR STA 2 including the WURx performs the WUR negotiation with the AP WUR STA 1, according to an embodiment of the present disclosure will be described with reference to Part 2 of FIG. 9.

According to one embodiment, for a wake-up based power save, the wireless communication terminal may enter the WURx mode. Here, the WURx mode may be a mode in which the PCR transceiver of the wireless communication terminal is in a doze state and may receive a wake-up packet through WURx. If the wireless communication terminal is operating in the WURx mode, the wireless communication terminal may receive a wake-up packet that triggers a wake-up of the PCR transceiver using WURx.

Referring to part2 of FIG. 9, when a station WUR STA 2 attempts to enter the WURx mode, the station WUR STA 2 may transmit the WURx mode request to the AP WUR STA 1. In this case, the station WUR STA 2 may transmit the WURx mode request to the AP WUR STA 1 using the PCR transceiver. The station WUR STA 2 may receive the WURx mode response for the WURx mode request from the AP WUR STA 1. In this case, the AP WUR STA 1 may transmit the WURx mode response including the WURx mode entrance permission status of the station WUR STA 2 to the station WUR STA 2. For example, the AP WUR STA 1 may transmit the WURx mode response that allows the WURx mode entrance of a station to the station WUR STA 2. The WURx mode entrance permission status will be described in detail with reference to FIG. 10. The station WUR STA 2 receives the WURx mode response from the AP WUR STA 1. The station WUR STA 2 may may determine the state of the PCR based on the received WURx mode response. The station WUR STA 2 may set a timer for retransmitting the WURx mode request at the time point at which it transmits the WURx mode request to the AP WUR STA 1. If the station WUR STA 2 fails to receive the WURx mode response from the AP WUR STA 1 until the timer expires, the station WUR STA 2 may retransmit the WURx mode request.

If the station WUR STA 2 successfully receives the WURx mode response that allows the WURx mode entrance from the AP WUR STA 1, the station WUR STA 2 may transition the PCR transceiver to the doze state and may may perform a wake-up based power save using WURx. When the station WUR STA 2 enters the WURx mode, the station STA2 may receive a wake-up packet that triggers a wake-up of the PCR transceiver from the AP STA1 through a WURx.

Hereinafter, an operation that a station wakes-up by receiving a wake-up packet according to an embodiment of the present disclosure will be described.

According to an embodiment, the station may receive a wake-up packet from an AP and wake-up a PCR transceiver of the station. As described above, the station may receive a wake-up packet through a WURx that receives a signal transmitted in a different modulation method from the PCR signal. In addition, the station may wake-up the PCR transceiver of the station based on the wake-up packet. Referring to the FIG. 9, the wake-up packet contains a WID of the station that receives the wake-up packet, a time at which the wake-up packet is transmitted (e.g., time stamp), and a subsequent operation identifier SID indicating a subsequent operation after the station wakes-up.

The station may parse the wake-up signaling field of the wake-up packet received through the WURx. The station may parse the wake-up signaling field to obtain address information. If the parsed address information indicates the WUR identifier (WID) of the station or the group identifier (GID) of the group that includes the station, the station may wake-up the PCR transceiver of the station. Specifically, the station may enable the PCR transceiver to operate in an awake state. At this point, the awake state of the PCR transceiver may indicate a state in which the station may transmit and receive through the PCR transceiver.

According to an embodiment, a station that includes a WURx may obtain information on an operational sequence after wake-up from a wake-up packet. The information on the operational sequence after the wake-up may be a SID that identifies the subsequent operation. For example, the PCR transceiver of the station may operate based on a subsequent operation identifier SID indicating a wake-up subsequent operation. Specifically, the subsequent operation identifier SID may include type information of a frame to be transmitted/received after the PCR transceiver of the station wakes-up. For example, the frame type information may include information indicating a transmission method of a frame to be transmitted and received. Depending on the transmission direction, a frame may be classified into an up-link (UL) transmission frame transmitted from a station to an AP and a downlink (DL) transmission frame type transmitted from an AP to a station. Also, a frame may be classified into a single-user (SU) and a multi-user (MU) frame type according to the number of stations transmitting and receiving with the AP through a frame.

According to an embodiment, a WURx may deliver the information obtained from a wake-up packet to a PCR transceiver in a process of waking-up the PCR transceiver. The WURx may store a part of the information obtained by parsing the wake-up packet. When the PCR transceiver is awake, the WURx may deliver the stored part of the information to the PCR transceiver. Specifically, the WURx may transmit at least one of a WID or GID, a subsequent operation identifier SID after wake-up, and time stamp information on a time at which a wake-up packet is received, to the PCR transceiver. The WURx may transmit information obtained from the wake-up packet to the PCR transceiver through an internal interface.

Meanwhile, the station may not perform the communication function through WURx while the PCR transceiver operates in the awake state. In this case, the station may not maintain the power of WURx. Through this, the station may reduce unnecessary power consumption and increase power efficiency.

According to one embodiment, the station may maintain WURx in a state capable of receiving until a time point that recognizes the successful wake-up of the station's PCR transceiver. This is because the AP that recognizes that the station fails to wake-up may retransmit the wake-up packet. In this case, the station may maintain the WURx in a state capable of receiving in order to receive the wake-up packet transmitted from the AP. Here, a successful wake-up may indicate successful PCR frame exchange between the station and the AP after the wake-up packet is transmitted. Specifically, after the wake-up packet is transmitted, if the exchange of the PCR frame is successful for the first time between the station and the AP, the station may determine that the PCR transceiver wakes-up successfully. The station may transmit and receive frames to guarantee a successful wake-up using a PCR signal with a shorter transmission time than the WUR signal. In this case, a frame exchange for checking a successful wake-up may be performed through frame transmission/reception between the station and the AP. In this case, the type of frame may not be limited.

According to one embodiment, until the time point at which the AP successfully exchanges frames after receiving the wake-up packet from the AP, the station may maintain WURx to be available for reception. For example, the station may maintain WURx to be available for at least the frame exchange time. The frame exchange time may be the time from the time point at which the station receives the wake-up packet to the time point at which it successfully exchanges frames with the AP. In this case, the AP may be the AP that transmits the wake-up packet to the station. Here, the frame exchange includes a first case that an AP receiving a frame transmitted from a station transmits a response frame in response to the received frame and a second case that the station receiving a frame transmitted from the AP transmits a response frame in response to the received frame. The first case will be described with reference to Part 3 of FIG. 9, and the second case will be described with reference to FIG. 11.

Hereinafter, a method of operating according to the first case after the station receives a wake-up packet according to an embodiment of the present disclosure will be described with reference to Part 3 of FIG. 9.

According to one embodiment, referring to part 3 of FIG. 9, a station WUR STA 2 including WURx may transmit a frame to the AP WUR STA 1 to inform the AP WUR STA 1 that it may transmit and receive through a PCR transceiver using a PCR signal. For example, a station WUR STA 2 may transmit an awake frame to an AP WUR STA 1. In this case, the awake frame may indicate the first frame transmitted to the AP through the PCR transceiver after the PCR transceiver wakes-up. The awake frame may be a frame indicating that the PCR transceiver is in an awake state.

Specifically, the station WUR STA 2 may attempt to access a channel to transmit an awake frame. In this case, the station WUR STA 2 may start the channel contention procedure after a predetermined time has elapsed from the time of wake-up. Here, the predetermined time may be the time indicated by the AP. The station WUR STA 2 may obtain information indicating a time point of starting the channel contention procedure from the wake-up subsequent operation information included in the wake-up packet. Alternatively, the station WUR STA 2 may obtain from the AP information indicating the time point of starting the channel contention procedure through the link establishment procedure or the WUR negotiation procedure described above. For example, when a plurality of stations wake-up, the AP may indicate a channel access start time point for awake frame transmission to the plurality of stations. In this case, the channel access start time point assigned to each of the plurality of stations may be different from each other. The AP may distribute the channel contention operation of a plurality of stations through this operation. The station WUR STA 2 may determine a time to start channel contention based on at least one of information indicating a time point to start the channel contention procedure, a timestamp at which the wake-up frame is received, and a wake-up delay. The station WUR STA 2 may perform a channel contention procedure to transmit the awake frame based on the determined time.

Here, the awake frame may be any frame used in the PCR transmission/reception, and is not limited to a specific frame. The awake frame may be a wake-up report WU report which delivers to the AP that the wireless communication terminal may in a state capable of transmitting and receiving through the PCR transceiver. For example, the awake frame may include a management frame or a control frame. Or, the awake frame may include a data frame.

As shown in FIG. 9, after transmitting the awake frame, the station WUR STA 2 may receive an awake response (hereinafter referred to as 'AW response frame') from the AP WUR STA 1. The AP WUR STA 1 receiving the awake frame may transmit the AW response frame to the station WUR STA 2. In this case, AW response frame may be any frame used in the PCR transmission/reception, and is not limited to a specific frame. The AP WUR STA 1 may transmit an AW response frame to the station WUR STA 2 using the PCR signal.

When the station WUR STA 2 receives the AW response frame from the AP WUR STA 1, the station WUR STA 2 may determine that the wake-up of the PCR transceiver of the station WUR STA 2 is successful. In this case, the station WUR STA 2 may maintain the WURx in a state capable of receiving at least until it receives the AW response frame from the AP WUR STA 1. The station WUR STA 2 may maintain the power of WURx in a turn-on state at least until it receives the AW response frame from the AP WUR STA 1. After the station WUR STA 2 receives the AW response frame from the AP WUR STA 1, the station WUR STA 2 may be allowed to turn-off the power of the WURx.

Meanwhile, according to one embodiment, if the wake-up operation of the PCR transceiver of the station becomes unnecessary after the AP transmits the wake-up packet, the AP may transmit an AW response frame including the corresponding information to the station. When receiving an AW response frame including wake-up inactivity information indicating that the wake-up of the station is not needed from the AP, the station may enter the WURx mode. In this case, as described above, the station may transition the PCR transceiver to the doze state based on the wake-up inactivity information and wait for reception of the wake-up packet through WURx.

According to one embodiment, the AP receives an awake frame from a station that does not transmit a wake-up packet. In this case, the AP may transmit an AW response frame including the wake-up error information indicating that there is an error in the wake-up. If the station receives the AW response frame indicating that there is an error in the wake-up, the station may perform the WUR negotiation procedure again with the AP. Also, the AP may allocate a new WID to the station. In addition, the station may perform the power save operation based on the WUR using the newly allocated WID.

Hereinafter, according to an embodiment of the present disclosure, when a frame exchange for validating a successful wake-up fails, the operation of the wireless communication terminal will be described with reference to FIG. 10.

Figure 10:
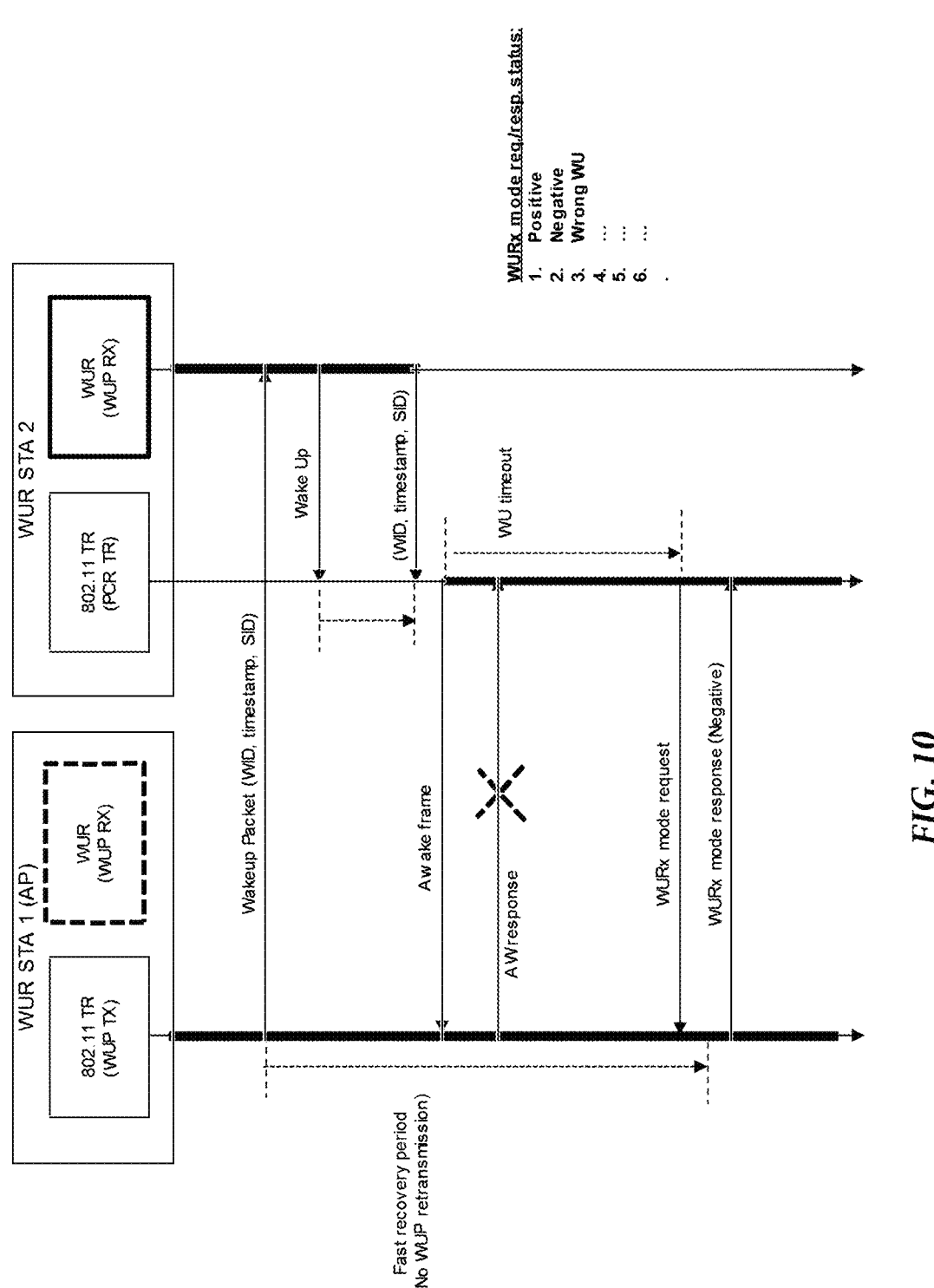
FIG. 10 illustrates operations of a wireless communication terminal when a frame exchange for validating a wake-up fails according to an embodiment of the present disclosure.

FIG. 10 illustrates operations of a wireless communication terminal when a frame exchange for validating a wake-up fails according to an embodiment of the present disclosure.

According to one embodiment, when the station fails to receive the AW response frame from the AP within a predetermined time after transmitting the awake frame, it may attempt to enter the WURx mode. Here, the predetermined time may be a time point at which the predetermined timer expires to stop the operation of receiving the AW response frame from the time point at which the awake frame is transmitted. The predetermined timer may be a time value set by the AP or the station. In addition, the predetermined time value may be transmitted and received through the WUR negotiation procedure or the link establishment procedure. Or the station may receive the predetermined time value from the AP. If a predetermined time value is not exchanged between the AP and the station, the station may set the timer to a default value. In addition, the predetermined time value may be a default value that is applied equally to all stations.

According to one embodiment, if the station does not receive a response frame from the AP until the time point at which the timer expires, the station may attempt to enter the WURx mode described above. According to one embodiment, if the station does not receive a response frame from the AP until the time point at which the timer expires, the station may transmit WURx mode request. The station may insert wrong information wrong WU indicating that there is an error in the wake-up procedure in the WURx mode request.

The station that transmits the WURx mode request may receive the WURx mode response from the AP. In this case, the station may receive the WURx mode response including the WURx entrance mode permission status of the station as described above. For example, the AP may insert indication information indicating the WURx entrance mode permission status in the WURx mode response. Specifically, the indication information indicating the WURx mode entrance permission status may include 'negative' indication information indicating that the WURx mode entrance of the station is not allowed. Alternatively, the indication information indicating the WURx mode entrance permission status may include 'positive' indication information indicating that the WURx mode entrance of the station is allowed. The station may receive the WURx mode response that does not allow the WURx mode entrance of the station. In this case, the station may determine whether to enter the WURx mode based on the WURx mode response received from the AP.

The embodiment of FIG. 10 shows the operation of the station when the transmission of the response frame in response to the awake frame transmitted by the AP fails. The AP may transmit the WURx mode response including a 'negative' indication information on the WURx mode request of the station. If the AP receives the WURx mode request despite having a history of transmitting a response frame to the station, this means that the transmission of the response frame transmitted by the AP fails. If the station receives the WURx mode response including 'negative' indication information, it may not enter the WURx mode. In this case, the station may determine that the frame for validating a successful wake-up is successfully exchanged. As described with reference to FIG. 8, the station may maintain WURx in a state capable of transmitting/receiving until in receives the WURx mode response including 'negative' indication information. Specifically, when the station receives the WURx mode response containing 'negative' indication information from the AP, the station may be allowed to turn-off WURx.

On the other hand, according to one embodiment, if the station receives the WURx mode response containing 'positive' indication information on the WURx mode request from the AP, the station may perform a wake-up based power save using WURx. In this case, the station may transition the PCR transceiver to the doze state.

According to an embodiment, a procedure of transmitting the WURx mode request after expiration of a timer based on a time point at which the AP transmits a wake-up packet may be referred to as a WURx fast recovery procedure. Each frame transmitted and received during the fast recovery process may be transmitted and received through the PCR transceiver of the station.

According to one embodiment, the AP may not transmit additional wake-up packets to the station until the time point at which the fast recovery procedure ends. The AP may transmit an additional wake-up packet after a predetermined fast recovery time has elapsed since the wake-up packet is transmitted. Here, the fast recovery time may be calculated based on at least one of a wake-up delay of the station and an airtime required for frame transmission. Here, the airtime may mean the time required for transmitting the frame through the transmission medium.

As in the second case in the above-described frame exchange, the station may wait for reception of the PCR frame transmitted from the AP without transmitting the frame immediately after the wake-up of the PCR transceiver. For example, the station may transmit an awake frame according to triggering of the AP after waking-up the PCR transceiver. The station may transmit an awake frame based on the wake-up frame received from the AP. The station may transmit an awake frame as it receives the request frame. The station may maintain the WURx of the station in the state capable of receiving until it transmits the awake frame.

Figure 11:
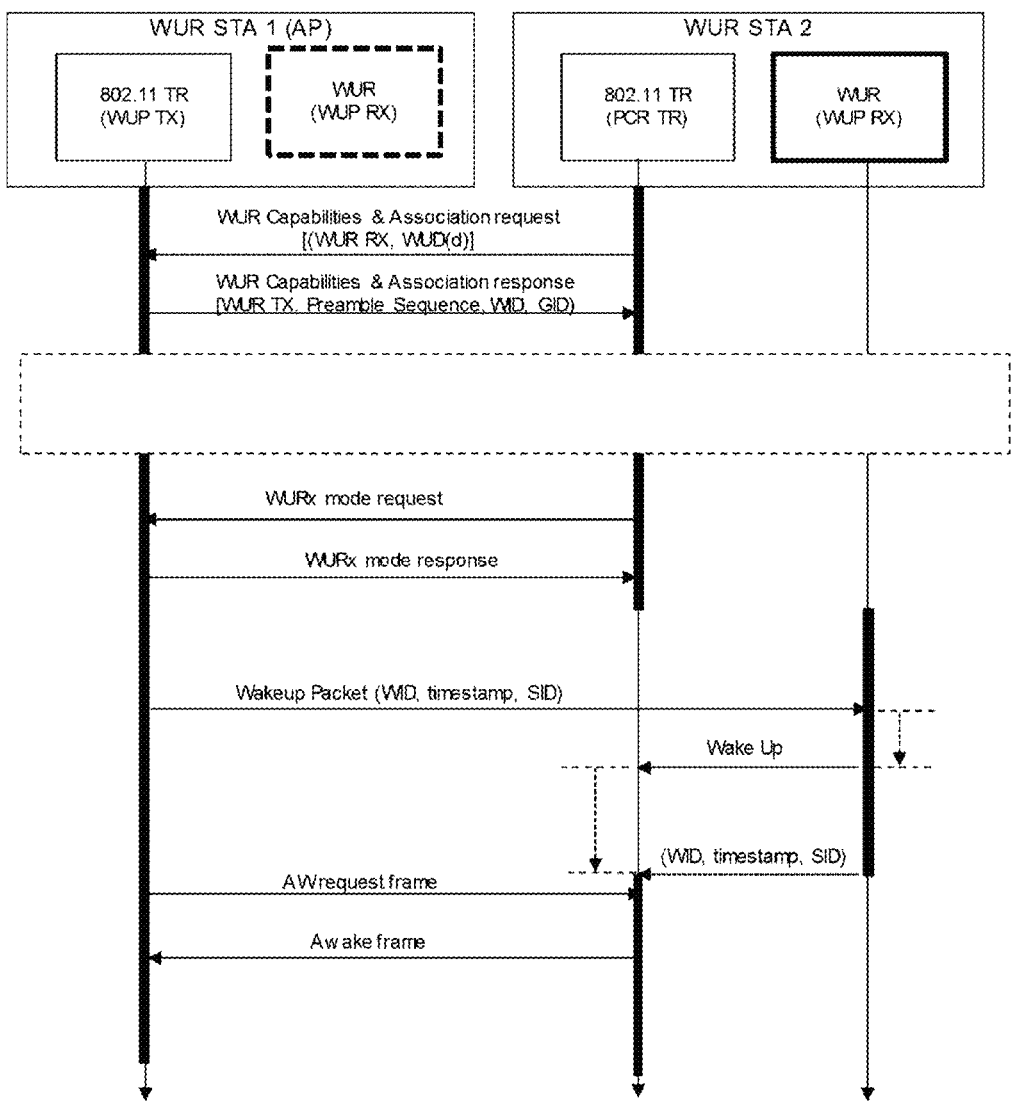
FIG. 11 shows a process of transmitting an awake frame by a wireless communication terminal according to a triggering of an AP according to an embodiment of the present disclosure.

FIG. 11 shows a process of transmitting an awake frame according to triggering of an AP according to an embodiment of the present disclosure. In FIG. 11, a WUR STA 1 represents a WUR station, which is an AP. Also, a WUR STA 2 represents a WUR station, which is not an AP.

According to one embodiment, the station may transmit an awake frame according to triggering of the AP after waking-up. The station may receive an awake request (hereinafter referred to as an 'AW request frame') requesting an awake frame from the AP. The station may receive an AW request frame from the AP through the PCR transceiver. The AW request frame may include the receiver address (RA) of the station.

Here, the AW request frame may be any frame used in the PCR transmission/reception, and is not limited to a specific frame. The AW request frame may be a control frame such as a poll frame requesting a frame from the station. Or the AW request frame may be a data frame including downlink (DL) transmission data. The AW request frame may be a trigger frame requesting the station for an awake frame. In this case, the AP may receive an awake frame based on the trigger frame from the station.

According to one embodiment, the AP may transmit an AW request frame based on the wake-up delay of the station. For example, the AP may determine a transmission time point for transmitting an AW request frame based on the time point at which the AP transmits the wake-up packet and the wake-up delay of the station. The AP may transmit an AW request frame to the station at the determined transmission time point. The AP may obtain the wake-up delay of the station in the WUR association procedure or the WUR negotiation procedure described above.

According to one embodiment, after a predetermined time from the time point at which the station receives the AW request frame, the station may transmit an awake frame to the AP. Specifically, the station may transmit an awake frame to the AP after the short inter-frame space (SIFS) from the time point at which the station receives the AW request frame. Alternatively, after the station receives the AW request frame, the station may obtain a transmission opportunity in the new channel contention to transmit the awake frame to the AP.

According to one embodiment, when the station transmits an awake frame to the AP, it may determine that the PCR transceiver of the station succeeds in wake-up. In this case, the station may maintain WURx in a state capable of receiving until it transmits an awake frame to the AP. The station may maintain WURx in a state capable of receiving until it completes transmitting the awake frame to the AP. During the frame exchange time from the time point at which the wake-up packet is received to the time point at which the awake frame is transmitted to the AP, the station may maintain WURx in a state capable of receiving. After the station transmits an awake frame to the AP, the station may be allowed to turn-off WURx. In this case, the frame exchange time may include a time required for the station to obtain a transmission opportunity through channel contention in order to transmit an awake frame, and an airtime for transmitting an AW request frame and an awake frame.

According to another embodiment, the station may maintain WURx in a state capable of receiving from when it transmits an awake frame to the AP to when it receives the AW response frame. In this case, the AP may transmit an AW response frame to the station after a predetermined time based on the time point at which the AP receives the awake frame. Specifically, the AP may transmit the AW response frame to the station after a short inter-frame space (SIFS) based on a time point at which the AP receives the awake frame. Alternatively, after the AP receives the awake frame, the AP may obtain a transmission opportunity in the new channel contention to transmit an AW response frame to the station.

When the station receives the AW response frame from the AP in response to the awake frame, it may determine that waking-up the PCR transceiver of the station is succeed. This is because the station may recognize that the station succeeds in transmitting the awake frame at the time point at which it receives the AW response frame from the AP. The station may maintain WURx in a state capable of receiving at least until the time point at which it receives an AW response frame from the AP. After the station receives the AW response frame from the AP, the station may be allowed to turn-off WURx.

According to one embodiment, the station may wait to receive an AW request frame for a predetermined time after receiving the wake-up packet. In this case, the station may maintain the PCR transceiver in an awake state for a time for waiting to receive the AW request frame. If the station fails to receive an AW request frame from the AP for a predetermined time after receiving the wake-up packet, the station may attempt to enter the WURx mode as described with reference to FIG. 9. Alternatively, after the time to wait for receiving the AW request frame from when the wake-up packet is received is elapsed, the station may be allowed to transition the PCR transceiver to the doze state.

The time to wait for receiving an AW request frame may include a wake-up delay of the station. Further, if the wake-up packet is a group wake-up packet, the time to wait for receiving the AW request frame may include a maximum wake-up delay of the group described below. The time to wait for receiving the AW request frame may include the wake-up delay of the station and the airtime required to transmit the frame. In order to consider the time it takes for a station to obtain a transmission opportunity in a channel competition due to channel congestion, the time to wait for receiving the AW request frame may be set to a time longer than SIFS. The station may determine a time longer than a time for which the wake-up delay and the SIFS elapse from when the wake-up packet is received as the time to wait for receiving the AW request frame.

Hereinafter, according to one embodiment of the present disclosure, if the AP fails to receive an awake frame, the operation of the AP will be described.

According to one embodiment, the AP may transmit a second wake-up packet after a predetermined time based on a time point at which a first wake-up packet is transmitted. This is because if the AP fails to receive any frame from the station within the predetermined time, the AP may determine that the station does not receive the first wake-up packet. For example, the AP may transmit a second wake-up packet if it fails to receive an awake frame from the station within the predetermined time after transmitting the first wake-up packet. In this case, the first wake-up packet may be the last wake-up packet transmitted by the AP.

In this case, the transmitted second wake-up packet may be a wake-up packet containing different information than the first transmitted wake-up packet. Or the second wake-up packet may be the same wake-up packet as the first wake-up packet. For example, the second wake-up packet may contain indication information for waking-up a plurality of stations including the station set as the receiver of the first wake-up packet. Or the second wake-up packet may contain wake-up packet failure information indicating that the transmission of the first wake-up packet fails.

According to an embodiment, the station may receive both the first wake-up frame and the second wake-up frame. In this case, the station may determine the information necessary for performing the wake-up operation according to the time when the wake-up packet is received. For example, if the station receives a second wake-up packet after the first wake-up packet is received, it may perform a wake-up operation based on the wake-up related information included in the second wake-up packet.

According to one embodiment, if the AP does not receive the awake frame from the station within the predetermined time based on the time point when it transmits the AW request frame, the AP may determine that the first wake-up packet transmission fails. In this case, the AP may transmit a second wake-up packet to the station.

According to another embodiment, if the AP does not receive an awake frame from the station within a predetermined time based on the time point when it transmits the AW request frame, the AP may retransmit the AW request frame to the station through the PCR signal. In this case, the AP may not retransmit the wake-up packet to the station. In the case of the wake-up packet, since one bit is transmitted through one OFDM symbol, the time required for transmission may be longer than the time required for transmission of the AW request frame. Therefore, the AP may retransmit the AW request frame through the PCR signal before retransmitting the wake-up packet. If the AP does not receive an awake frame from the station within a predetermined time based on the time point when the AP transmits the AW request frame, the AP may transmit a new wake-up packet to the station.

Meanwhile, the transmission of the wake-up packet through the WUR may be a large overhead in the network since one bit has the length of one OFDM symbol. The AP may trigger wake-up of the PCR transceiver of a plurality of stations in the BSS using one wake-up packet. The AP may trigger the wake-up of the PCR transceiver of the plurality of stations in the BSS with one wake-up packet through the multicast or broadcast method using the group identifier.

Hereinafter, a method for triggering the wake-up of the PCR transceiver of a plurality of wireless communication terminals using one wake-up packet according to an embodiment of the present disclosure will be described with reference to FIGS. 12 and 13.

Figure 12:
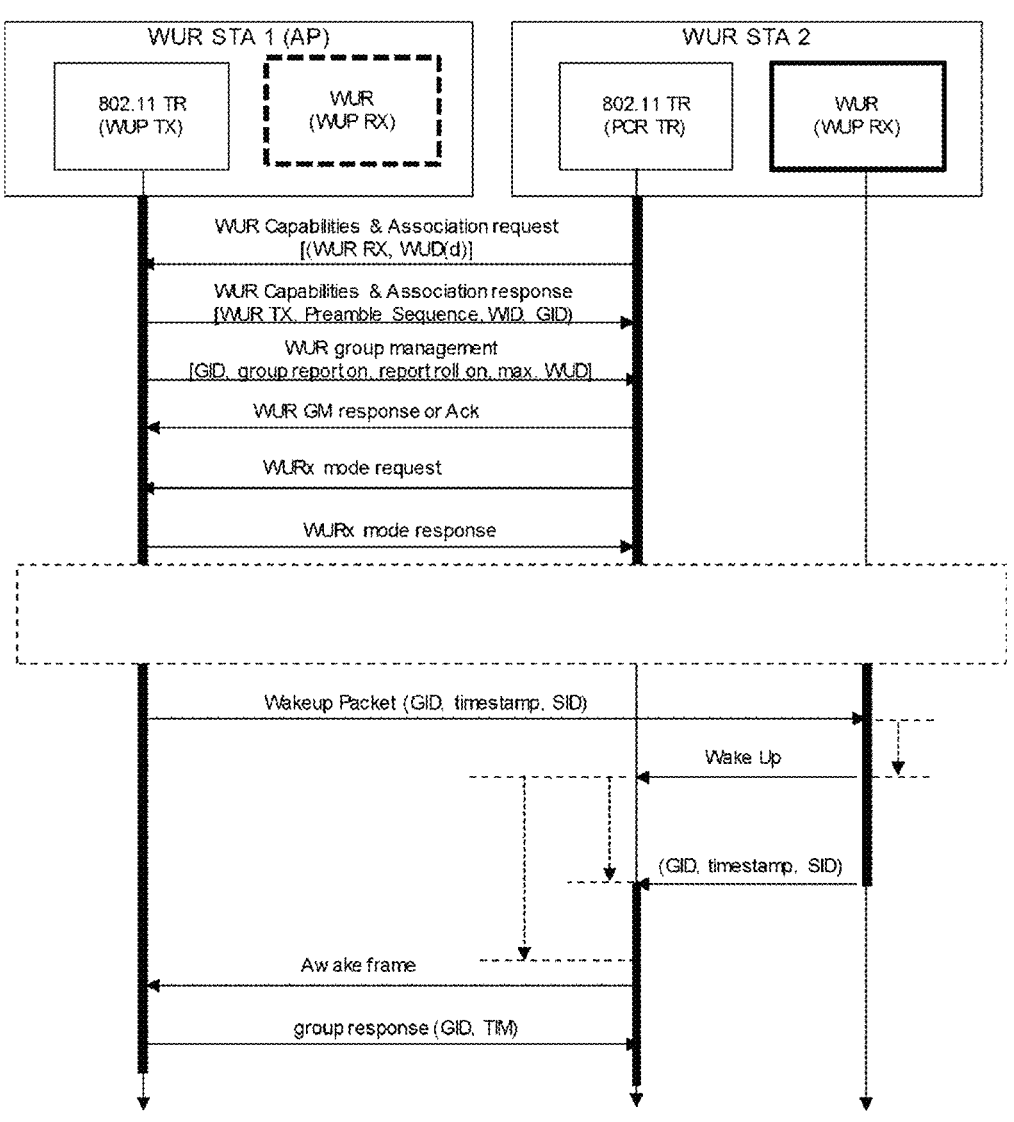
FIGS. 12 and 13 illustrate a method in which a wireless communication terminal wakes-up through a group wake-up packet including a group identifier according to one embodiment of the present disclosure.
Figure 13:
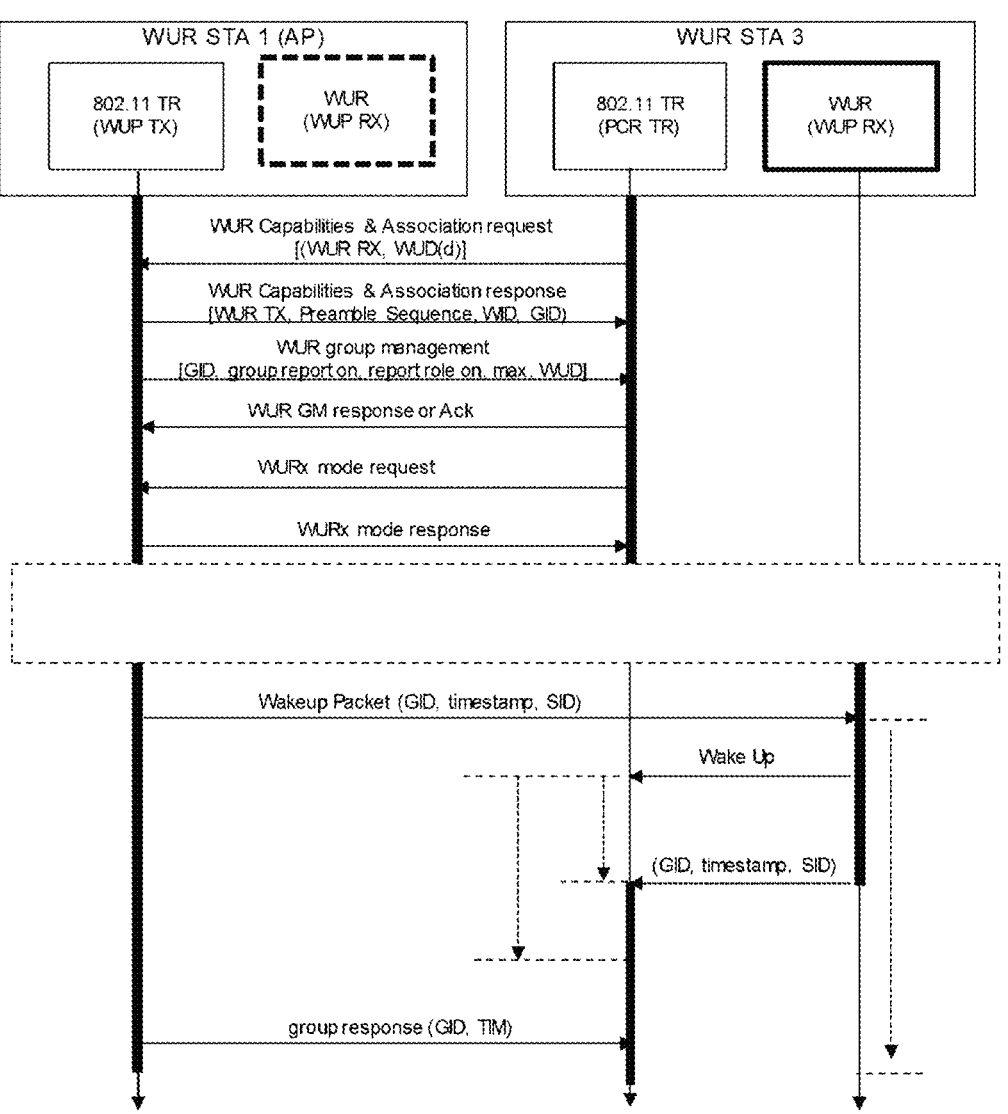

FIGS. 12 and 13 illustrate a method in which a station wakes-up through a group wake-up packet including a group identifier according to one embodiment of the present disclosure.

According to one embodiment, a station may utilize a group management element to wake-up through a group wake-up packet. For example, the station may obtain a group management element from the AP. The station may obtain the group management element through the PCR frame received in the WUR association procedure or the WUR negotiation procedure. Alternatively, the station may receive a separate WUR group management (WUR GM) including the group management element from the AP through the PCR transceiver. When the station receives the group management element through the WUR GM frame, the station may transmit a WUR GM response frame in response to the WUR GM frame.

According to one embodiment, the group management element may include a group identifier GID that identifies the group to which the station belongs. The group identifier GID may include a group address GA. Basically, a station including WURx may obtain a WUR identifier (WID) that identifies the station from the AP through the WUR negotiation procedure described above. For example, in a WUR association procedure or a WUR negotiation procedure, an AP may allocate a WID indicating a station to a station. In addition, the AP may designate a group including a plurality of stations, with respect to a plurality of stations included in the BSS operated by the AP. The AP may allocate a group identifier GID for identifying each group to each group. The station may obtain the GID allocated to the station from the AP through the group management element.

According to one embodiment, the group management element may include a maximum wake-up delay max. WUD that represents the longest wake-up delay among the wake-up delays of each of the stations included in the group. This is because if the wake-up delay of the station is less than the maximum wake-up delay, the frame may be transmitted and received based on the wake-up delay of a station other than the station. This will be described later with reference to FIGS. 12 and 13.

According to one embodiment, the group management element may include group report information indicating whether awake frame transmission is available in response to the group wake-up packet. If the group report is in a state of group report off, the station may determine that a plurality of stations included in the group will not transmit an awake frame. For example, the AP may not assign a role for transmitting an awake frame to any one of a plurality of stations included in the group. If the group report is in a state of group report on, the station may determine that at least one of the plurality of stations included in the group is to transmit an awake frame. If a group report is in a state of group report on, the group management element may include an awake frame role information indicating whether a role for transmitting the awake frame to the AP is assigned to the station after the PCR transceiver of the station wakes-up. Here, the role for transmitting the awake frame may indicate the obligation of the station receiving the wake-up packet to wake-up the PCR transceiver of the station and then transmit the awake frame to the AP through the PCR transceiver.

According to one embodiment, an AP may assign an awake frame role for transmitting an awake frame to at least one of a plurality of stations included in the group. In addition, the AP may signal information indicating at least one station having an awake frame role for transmitting an awake frame through the PCR transceiver of the station among a plurality of stations included in the group. For example, the AP may signal information indicating at least one station having an awake frame role among a plurality of stations included in the group through a WUR association or a WUR negotiation procedure. Or the AP may insert information indicating the awake frame role assigned to each station into the group wake-up packet.

Specifically, the AP may generate bitmap information that may identify which station among a plurality of stations included in the group is assigned with an awake frame role. Here, the bitmap information may include awake frame role information that is mapped to each of a plurality of stations included in the group. For example, information in bitmap format may include information indicating the awake frame role of the first station WUR STA 2 in a state of group report on and the awake frame role of the second station WUR STA 3 in a state of group report off. In this case, the bitmap information may be indicated using one bit indicating whether the awake frame role is activated for each station. For example, the bitmap information may include a plurality of bits (e.g., '0' or '1') indicating an awake role that is mapped to each of a plurality of stations included in the group.

According to one embodiment, the station may obtain from the AP the information indicating at least one station having an awake frame role among a plurality of stations included in the group. In this case, the station may determine whether to transmit an awake frame based on information indicating at least one station having an awake frame role among a plurality of stations included in the group. If the awake frame role is group report on, the station may transmit an awake frame to the AP after receiving the group wake-up packet. If the awake frame role is group report off, the station may not transmit the awake frame to the AP after receiving the group wake-up packet.

Specifically, if the station obtains information indicating that the awake frame role of the station is group report on from the AP, the station may transmit the awake frame to the AP after waking-up the PCR transceiver. In this case, the station may maintain WURx in a state capable of receiving at least until it receives the AW response frame in response to the awake frame from the AP.

Alternatively, if the station obtains from the AP the information indicating that the awake frame role of the station is group report off, the station may not transmit the awake frame after waking up the PCR transceiver. In this case, the station may wait for reception of a frame transmitted from the AP after waking up the PCR transceiver. Also, in case that a station receives an AW request frame from an AP, the station may maintain WURx in a state capable of receiving at least until it transmits an awake frame for an AW request frame.

Hereinafter, an operation of a station according to an embodiment of the present disclosure to wake-up through a group wake-up packet will be described.

According to one embodiment, the AP may transmit a group wake-up packet to a plurality of stations. The group wake-up packet may be a wake-up packet including information related to wake-up of a plurality of stations. A group wake-up packet may trigger a wake-up of the PCR transceiver to each of a plurality of stations. For example, the group wake-up packet may include indication information for waking up a plurality of stations. The group wake-up packet may include a group identifier GID indicating a plurality of wireless communication terminals receiving the same group wake-up packet. In addition, the station may obtain maximum wake-up delay information to use in subsequent wake-up operations based on the group identifier GID.

According to one embodiment, the group wake-up packet may include subsequent operation information indicating a subsequent operation to be performed after the station receives the group wake-up packet. The AP may insert subsequent operation information distinguished by each of a plurality of stations receiving a group wake-up packet into the group wake-up packet. This is because it is possible to perform different subsequent operations for each of a plurality of stations receiving the group wake-up packet. For example, the group wake-up packet may include bitmap information indicating the subsequent operation information distinguished by each of the plurality of stations. The group wake-up packet may include a subsequent operation identifier (SID) that identifies a wake-up subsequent operation of each station distinguished by each of a plurality of stations.

For example, the station-specific subsequent operation information included in the group wake-up packet may include information on whether the station receiving the group wake-up packet wakes-up. This is because the AP may use a group wake-up packet to wake-up some specific stations among a plurality of stations included in the group. Specifically, the AP may insert into a group wake-up packet the information indicating at least one station that performs wake-up among a plurality of stations that receive the group wake-up packet. In this case, the AP may insert information indicating at least one station performing the wake-up into the wake-up packet in a bitmap format. Specifically, bitmap information indicating at least one station performing wake-up among a plurality of stations may include wake-up status information that is mapped to a WID of each of a plurality of stations.

Further, as described above, the group wake-up packet may include information indicating at least one station having an awake frame role for transmitting an awake frame among a plurality of stations included in the group. For example, the AP may insert bitmap information that can identify which of a plurality of stations included in the group is assigned with an awake frame role into a group wake-up packet. The AP may transmit a wake-up packet including the bitmap information to a plurality of stations included in the group. The station may receive a group wake-up packet including bitmap information that can identify which station among the plurality of stations included in the group is assigned with the awake frame role through the WURx of the station.

According to one embodiment, the AP may assign the awake frame role information different from the awake frame role information assigned to the station through the WUR negotiation procedure. The AP may insert the awake frame role information assigned to the station into the group wake-up packet. Specifically, the AP may assign the awake frame role to a first station through the WUR negotiation procedure and may not assign the awake frame role to a second station. In this case, the AP may insert changed awake frame role information into the group wake-up packet for the first station and the second station. The AP insert bitmap information that does not assign the awake frame role to the first station, and assign the awake frame role to the second station into the group wake-up packet for the first station and the second station.

According to one embodiment, a group wake-up packet may include parameters that a station assigned with an awake frame role may use to transmit an awake frame. In this case, the parameter used for transmitting the awake frame may be a parameter used for channel access after the station receives the group wake-up packet or after the station wakes-up. For example, the parameters may include time information that the station starts to attempt channel contention procedures. In addition, the parameter may indicate an Access Category (AC) used for parameter determination for channel access. Through these embodiments, the AP may distribute channel accesses of a plurality of stations assigned with the awake frame role. In this case, the group wake-up packet may include time information for attempting different channel contention procedures for each of a plurality of stations assigned with an awake frame role.

According to one embodiment, the station may receive the group wake-up packet from the AP through WURx. The station may use a group management element in the process of waking up a PCR transceiver by receiving a group wake-up packet. For example, the station may wake-up the PCR transceiver based on the group identifier GID of the group to which the station belongs. Specifically, the station may parse the signaling field of the group wake-up packet through WURx. The station may wake-up the PCR transceiver of the station by comparing the group identifier GID indicated by the signaling field of the received group wake-up packet with the group identifier obtained from the group management element. Specifically, if the group identifier GID indicated by the signaling field of the received group wake-up packet is the same as the group identifier GID obtained through the group management element, the station may wake-up the PCR transceiver of the station.

According to one embodiment, the WURx of the station may transmit the information obtained through the wake-up packet to the PCR transceiver in the process of waking-up the PCR transceiver. For example, WURx may deliver at least one of a group identifier GID, a subsequent operation identifier SID, and information on a timestamp at which a wake-up packet is received to the PCR transceiver. In the case of the group wake-up packet, since a station can be included in a plurality of different groups, it is necessary to distinguish a wake-up for each group.

Hereinafter, in relation to operations after the station wakes-up, the operations will be described by dividing the operations into the operation of a first station WUR STA 2 assigned with the awake frame role referring to FIG. 12 and the operation of a second station WUR STA 3 not assigned with the awake frame role referring to FIG. 13.

FIG. 12 illustrates a case where a first station WUR STA 2 is assigned with an awake frame role according to an embodiment of the present invention.

According to one embodiment, the first station WUR STA 2 may transmit an awake frame to the AP WUR STA 1 after wake-up. The first station WUR STA 2 may transmit the awake frame to the AP WUR STA 1 without waiting for the frame transmitted from the AP WUR STA 1. Specifically, the first station WUR STA 2 may attempt channel access to transmit the awake frame to the AP WUR STA 1.

In this case, the first station WUR STA 2 may transmit the awake frame based on the maximum wake-up delay of the group including the first station WUR STA 2. The first station WUR STA2 may determine a transmission time point for transmitting the awake frame based on the time of receiving the group wake-up packet and the maximum wake-up delay. The first station WUR STA 2 may transmit an awake frame to the AP at the determined transmission time point. For example, the first station WUR STA 2 may transmit an awake frame to the AP WUR STA 1 after the maximum wake-up delay elapses from the time the group wake-up packet is received. This is because when the awake frame is transmitted before the maximum wake-up delay elapses, a wireless communication terminal which cannot validate whether the wake-up is successful may occur despite successful frame exchange. For example, a wireless communication terminal having a wake-up delay shorter than the maximum wake-up delay may transmit an awake frame before the maximum wake-up delay elapses from when the group wake-up packet is received. In this case, before another wireless communication terminal that receives the same group wake-up packet wakes-up, the AP WUR STA 1 transmits a response frame in response to the awake frame, so that a case of not validating whether wake-up is successful may occur. The AP WUR STA 1 may receive the awake frame from the first station WUR STA 2. In this case, the awake frame may include a group identifier GID to which the first station WUR STA 2 belongs.

According to an embodiment, the AP may transmit a group response frame to a plurality of wireless communication terminals included in the group to which the first station WUR STA 2 belongs. Here, the group response frame may be a response frame in response to an awake frame received from the first station WUR STA 2. The group response frame may be an AW response to a plurality of wireless communication terminals in the group including the first station WUR STA 2. The group response frame may include at least one of a group identifier GID and subsequent operation information after receiving a group response frame to be described later. Specifically, the AP WUR STA 1 may transmit a group response frame to a plurality of wireless communication terminals included in the group to which the first station WUR STA 2 belongs after a Short Inter-Frame Space (SIFS) from the time point of receiving the awake frame. Or after the AP WUR STA 1 receives the awake frame, the AP WUR STA 1 obtains a transmission opportunity in the new channel contention and transmits a group response frame to a plurality of wireless communication terminals included in the group to which the first station WUR STA 2 belongs.

According to one embodiment, when the first station WUR STA 2 receives the group response frame from the AP, the first station WUR STA 2 may determine that the wake-up is successful. In this case, the first station WUR STA 2 may maintain the WURx in the state capable of receiving until the group response frame is received. After the first station WUR STA 2 receives the group response frame, the first station WUR STA 2 may be allowed to turn-off WURx. In this case, the embodiment described with reference to FIG. 9, and related to the case where the station receives the AW response frame may be applied commonly.

Meanwhile, according to one embodiment, the group response frame may include subsequent operation information indicating a subsequent operation after the station receives the group response frame. Specifically, the subsequent operation information may include information indicating at least one station that performs data transmission/reception with the AP using the PCR signal, among a plurality of stations included in the group.

For example, the AP WUR STA 1 may generate information in a bitmap format that may identify which station among a plurality of stations included in a group actually participate in data transmission/reception using a PCR signal. Also, the AP may insert the generated bitmap format information into the group response frame. This is because the AP may use a group wake-up packet to wake-up some specific stations among a plurality of stations included in the group. In this case, the AP WUR STA 1 may transmit a group response frame including information on whether to maintain the wake-up state after all the stations in the group wake-up. The first station WUR STA 2 may determine whether to maintain the wake-up state based on the group response frame from the AP.

Specifically, the AP WUR STA 1 may transmit traffic indication map (TIM) information indicating a station that performs data transmission/reception with the AP WUR STA 1 using a PCR signal. The TIM information may indicate that the first station WUR STA 2 will transmit and receive data with the AP using the PCR transceiver. In this case, the first station WUR STA 2 receiving the group response frame may maintain the PCR transceiver in the awake state. Also, if the TIM information does not indicate that the AP and PCR transceiver will be used to transmit or receive data for some of the plurality of stations included in the same group as the first station WUR STA 2, some of the plurality of stations included in the same group as the first station WUR STA 2 may transition the PCR transceiver to the doze state. In this case, some stations transitioning the PCR transceiver to the doze state may enter the WURx mode without transmitting a separate WURx mode request to the AP.

FIG. 13 illustrates a case where the second station WUR STA 3 is not assigned with an awake frame role according to an embodiment.

According to one embodiment, when the second station WUR STA 3 receives and wakes-up the group wake-up packet, it may wait to receive the group response frame transmitted from the AP WUR STA 1. The AP WUR STA 1 may transmit a group response frame to a plurality of stations through a PCR signal. In this case, the group response frame may be the group response frame described with reference to FIG. 12. The group response frame may include at least one of a group identifier GID and subsequent operation information.

Alternatively, if the AP does not assign an awake frame role to any of a plurality of stations included in the group, the group response frame may be any frame transmitted from the AP. For example, the group response frame may include an AW request frame requesting an awake frame of the second station WUR STA 3 described with reference to FIG. 11.

According to one embodiment, the AP WUR STA 1 may transmit a group response frame based on the maximum wake-up delay of the group that transmits the group wake-up packet. This is because if the AP WUR STA 1 transmits a group response frame before the maximum wake-up delay of the group elapses, there may be a plurality of stations that may not wake-up. The AP WUR STA 1 may determine a transmission time point for transmitting the group response frame based on the maximum wake-up delay and the transmission delay of the wake-up packet. The AP WUR STA 1 may transmit the group response frame to the plurality of stations including the second station WUR STA 3 at the determined transmission time point. For example, the AP WUR STA 1 may calculate the group wake-up packet reception scheduled time of a plurality of stations included in the group based on the transmission delay of the group wake-up packet. Further, the AP WUR STA 1 may transmit the group response frame after the maximum wake-up delay elapses from the group wake-up packet reception scheduled time of the plurality of stations.

According to one embodiment, the AP WUR STA 1 may transmit a group response frame including a group identifier GID to a plurality of stations included in the group. This is because in the case of some stations among the plurality of stations included in the group, the MAC address of another station included in the group may not be identified. For example, a second station WUR STA 3 in the same first group as the first station WUR STA 2 may identify the group identifier GID of the first group but may not identify the MAC address of the first station WUR STA. Also, as described above, the second station WUR STA 3 may be included in the first group and the second group different from the first group at the same time. In this case, the second station WUR STA 3 may determine that the group response frame for the first group is received based on the group identifier GID of the first group included in the group response frame.

According to one embodiment, the second station WUR STA 3 may wait for a predetermined time to receive the group response frame transmitted from the AP WUR STA 1. In this case, the second station WUR STA 3 may maintain the PCR transceiver of the second station WUR STA 3 in the awake state for a time to wait for reception of the group response frame. The second station WUR STA 3 may calculate a predetermined time to wait for reception of the group response frame based on at least one of the maximum wake-up delay of the group to which the second station WUR STA 3 belongs and the air time required for transmission of the group response frame For example, the second station WUR STA 3 may maintain the PCR transceiver in the awake state from the time when the group wake-up packet is received until the predetermined time including the elapsed time of the maximum wake-up delay. In this case, the predetermined time may be set to a time longer than the SIFS. This is because the AP may consider the time it takes to obtain the transmission opportunity from the channel contention to transmit the group response frame.

According to one embodiment, when the second station WUR STA 3 fails to receive the group response frame transmitted from the AP WUR STA 1 within a predetermined time, it may transition the PCR transceiver to the doze state. In this case, the second station WUR STA 3 may enter the WURx mode without transmitting a separate WURx mode request to the AP WUR STA 1.

According to one embodiment, the group response frame may be a group response frame of the AP for an awake frame transmitted from another station (e.g., the first station WUR STA 2 of FIG. 12) included in the group to which the second station WUR STA 3 belongs. In this case, the second station WUR STA 3 may maintain the WURx in the state capable of receiving until it receives the group response frame. After the second station WUR STA 3 receives the group response frame, the second station WUR STA 3 may be allowed to turn-off WURx. The second station WUR STA 3 may determine that the second station WUR STA 3 succeeds in wake-up through a group response frame which is the AP's response to an awake frame transmitted from at least one of a plurality of stations included in the group. For example, if the second station WUR STA 3 receives a group response frame that is the AP's response to the awake frame transmitted from any of the plurality of stations other than the second station WUR STA 3 among a plurality of stations included in the group, the second station WUR STA 3 may determine that the second station WUR STA 3 succeeds in wake-up.

Hereinafter, a sensor network using a WUR beacon according to an embodiment of the present disclosure will be described with reference to FIG. 14 to FIG. 18.

Figure 14:
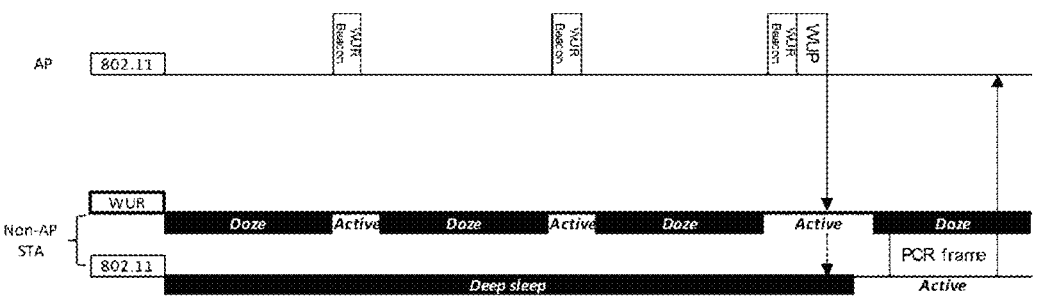
FIG. 14 illustrates a WUR beacon transmission according to one embodiment of the present disclosure.

FIG. 14 illustrates a WUR beacon transmission according to one embodiment of the present disclosure.

According to one embodiment, when a station operating in a state capable of transmitting and receiving a radio signal through PCR is out of the radio range of the AP, the station may not receive the beacon transmitted by the AP. In this case, the station may determine that the connection with the AP is lost. The station may attempt to scan to establish a link with the new AP.

On the other hand, a terminal operating in the WURx mode may not receive all frames transmitted by the AP to the PCT, including the beacon. Also, the terminal operating in the WURx mode may not transmit any frame through the PCR transceiver until the time point at which the wake-up packet is received or the PCR transceiver wakes-up. There-fore, the station operating in the WURx mode may not recognize that the station is in a state in which transmission and reception with the AP are impossible even when the station or the AP moves out of the AP's beacon reception range as the AP moves. This is because the station may not check that the PCR beacon is not received. Until the time point at which the station wakes-up the PCR transceiver and attempts to transmit and receive through the PCR signal, the station may maintain the wake-up packet standby state transmitted from the AP even though the connection with the AP is lost.

In order to prevent such ineffective operation, an AP associated with a station operating in the WURx mode may transmit WUR beacons using WUR. In this case, the WUR beacon may signal information on the BSS. Specifically, the WUR beacon may signal information such as beacon sig-naling information transmitted through PCR. A WUR bea-con may include legacy parts and WUR parts like a wake-up packet. The legacy part of the WUR beacon frame may have the same role and structure as the legacy part of the wake-up frame. The WUR part of the WUR beacon may include the identifier information of the AP and time synchronization function (TSF) information for maintaining the time syn-chronization by the wireless communication terminal oper-ating in the WURx mode. The AP may periodically transmit WUR beacons to the station. In this case, the period in which the AP transmits the WUR beacon may be longer than the period in which the PCR beacon is transmitted. The WUR beacon may not include receiver identification information, unlike the wake-up packet. A station receiving a normal WUR beacon may not wake-up a PCR transceiver to per-form active scanning. If the identifier of the AP of the received WUR beacon is different from the associated AP, the station may wake-up the PCR transceiver.

According to one embodiment, the period in which the WUR beacon is transmitted may be received from the AP in the WUR mode element, which is transmitted and received through the PCR signal, and the WURx mode request and the WURx mode response processes.

According to one embodiment, as the WUR beacon is periodically transmitted, a station operating in the WURx mode may operate WURx in a doze state to obtain an additional power save effect when there is no uplink (UL) data to be transmitted. The station may transition WURx to an active state at the time point at which the WUR beacon is transmitted based on the period in which the WUR beacon is transmitted.

If the AP needs to perform a downlink transmission to the station using PCR, the AP may transmit the wake-up packet immediately after transmitting the WUR beacon to the station. Alternatively, the AP may insert Traffic Indication Map (TIM) information indicating that there is downlink data to be transmitted through the PCR into the WUR beacon. Alternatively, the AP may transmit to the station a wake-up packet including TIM information indicating that there is downlink data to be transmitted through PCR.

If a station operating in the WUR mode fails to receive a WUR beacon for a predetermined time, the station may wake-up the PCR transceiver to check the network situation. The predetermined time may set based on the network channel environment. If the station does not receive a PCR beacon from the associated AP, the station may use the PCR transceiver for active scanning Specifically, the station may transmit a probe request frame through PCR. This is because the station may determine that the connection with the AP is lost.

Figure 15:
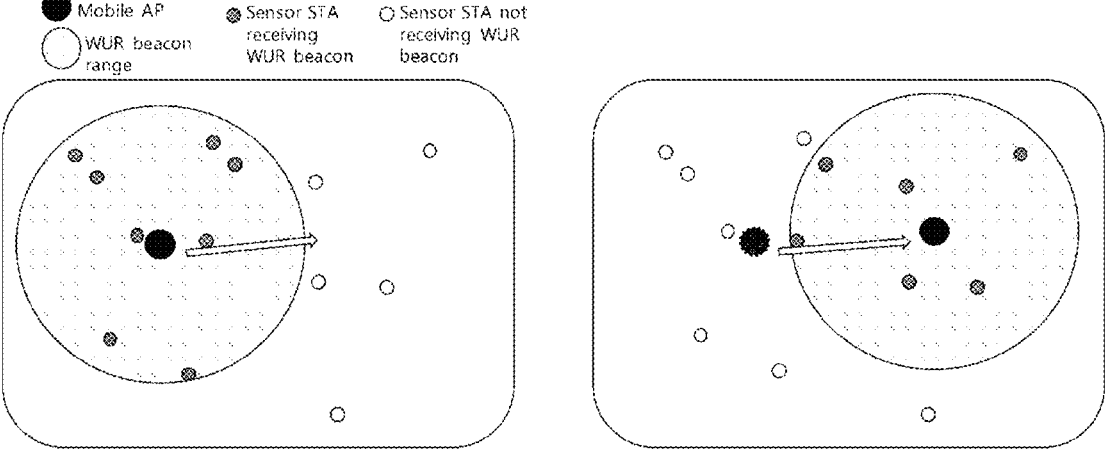
FIG. 15 illustrates an example of a sensor network using WUR according to one embodiment of the present disclosure.

FIG. 15 illustrates an example of a sensor network using WUR according to one embodiment of the present disclo-sure. A sensor and a sensor terminal included in a sensor network described below may be a station supporting WUR-based power save.

One of the WUR major application networks is the sensor network. In a sensor network environment according to an embodiment, a plurality of fixed sensor terminals in a specific area may operate with a low-capacity battery such as a coin battery, and may include a PCR transceiver for transmitting data measured in the vicinity. A sensor terminal included in the above sensor network may transmit data when a server queries the data. The sensor terminal may also be able to transmit data without the query of the server when a special situation occurs. The sensor terminal may addi-tionally include a WUR module (e.g., WURx) in addition to the PCR transceiver. This is because it is important for the sensor terminal to efficiently use the limited power of the battery. If a spatial range in which a sensor terminal is installed is wide and is an open space, a mobile device such as a smart phone may perform the AP function. For example, the mobile device may collect data at predetermined period from a sensor terminal installed within a predetermined spatial range. This is because it is inefficient to install a fixed AP for intermittent data collection.

According to one embodiment, when the sensor terminal in the sensor network may operate in the WURx mode, it may operate in a duty-cycle mode to minimize power consumption. Here, the duty cycle mode may mean a mode in which a WURx is operated in a doze state for a certain time in a predetermined duty cycle period. The duty cycle period may indicate the period in which the sensor terminal turns on WURx. When the sensor terminal is operating in the duty cycle mode, the sensor terminal may maintain WURx in a state capable of receiving during on-duration. The on-duration may indicate a duration in which the sensor terminal maintains the WURx turned on according to the duty cycle period to be in a state capable of receiving. An additional power save effect may be obtained by operating WURx in a doze state through a duty cycle mode.

For example, the duty cycle period may be determined based on the period in which the WUR beacon is transmit-ted. The sensor terminal may transition WURx to an active state at a predetermined beacon reception time point to receive a WUR beacon, but is not limited thereto. The sensor terminal may wait for the AP's data request at the time point at which the WUR beacon is received based on the WUR beacon period. If a special situation occurs at a time point at which the sensor terminal receives the WUR beacon, the sensor terminal may transmit an emergency report. If a special situation occurs, the sensor terminal may transmit an emergency report at the time point at which it receives the WUR beacon. This is because the sensor terminal may be located in an area capable of transmitting and receiving data with the AP in a period in which the WUR beacon is received.

Alternatively, the duty cycle period may be determined to be a shorter period than the period in which the WUR beacon is transmitted. In addition, the sensor terminal may synchronize the start time point of the duty cycle period with the AP. In this case, the sensor terminal may synchronize the start time point of the duty cycle using the WUR beacon. For example, as described above, the WUR beacon may include TSF information for maintaining time synchronization between the AP and the sensor terminal.

According to one embodiment, the sensor terminal may receive a duty cycle period and on-duration from the AP. For example, the duty cycle period and on-duration may be received from the AP in a WUR mode element, which is transmitted and received between the sensor terminal and the AP through the PCR signal, and the WURx mode request and the WURx mode response processes. The AP may determine the duty cycle period and the on-duration for each sensor terminal. In addition, the AP may transmit the determined duty cycle period and on-duration to each sensor terminal. In this case, the sensor terminal may receive the duty cycle period and the on-duration of the sensor terminal from the AP through the PCR transceiver.

According to one embodiment, when operating in a duty cycle mode, the sensor terminal may maintain WURx in a state capable of receiving during the on-duration from the start time point of the duty cycle period. In addition, the sensor terminal may receive a wake-up packet from the AP during on-duration from the start time point of the duty cycle period through WURx.

According to one embodiment, in the embodiment described with part 3 of FIG. 9, the sensor terminal may transmit an awake frame to the AP after wake-up. Also, the sensor terminal may receive the AW response frame for the awake frame from the AP. In this case, the sensor terminal may maintain the WURx in the state capable of receiving from when the wake-up packet is received to an earlier time among the time point at which the awake response frame is received from the AP and the time point at which the on-duration expires. The sensor terminal may be allowed to turn-off WURx after the sensor terminal receives the awake response frame from the AP or after the on-duration expires.

According to one embodiment, in the embodiment described through FIG. 11, the sensor terminal may receive an AW request frame from the AP after wake-up. In addition, the sensor terminal receiving the AW request frame may transmit the awake frame to the AP. In this case, the sensor terminal may maintain the WURx in the state capable of receiving from when the wake-up packet is received to an earlier time among the time point at which the awake response frame is transmitted to the AP and the time point at which the on-duration expires. The sensor terminal may be allowed to turn-off WURx after the sensor terminal receives the awake frame from the AP or after the on-duration expires. Through this operation, the sensor terminal may reduce the power consumed to maintain WURx after receiving the wake-up packet.

As shown in FIG. 15, when a plurality of sensor terminals are fixed and the AP moves in the sensor network, the fixed sensor terminal may not continuously receive the WUR beacon from the AP. The sensor terminal may wake-up the PCR transceiver during a time when the WUR beacon is not received from the AP and attempt to scan for link establishment of the AP. In this case, unnecessary power consumption of the sensor terminal may increase because an AP may not exist around the sensor terminal.

If the WUR beacon is not heard at the sensor terminal, it may be effective for the sensor terminal to wait for receiving the data request at the time point at which the WUR beacon is heard while maintaining the WURx mode until the time point at which the AP is coming close to the sensor terminal. If the sensor terminal does not have information on whether the AP establishing the link with the sensor terminal is movable, the sensor terminal may not be able to operate in this manner.

Hereinafter, a method of a wireless communication terminal to indicate a context in a WUR negotiation procedure according to an embodiment will be described with reference to FIG. 16 to FIG. 18.

Figure 16:
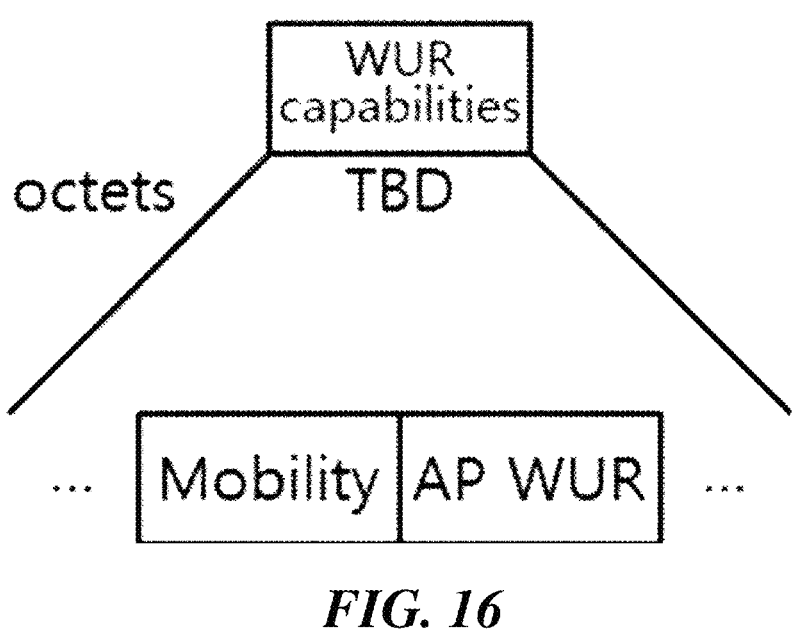
FIG. 16 illustrates a context indication method of a sensor terminal according to an embodiment of the present disclosure.

FIG. 16 illustrates a context indication method of a sensor terminal according to an embodiment of the present disclosure.

According to one embodiment, the AP may transmit context indication information indicating the context related to the AP to the sensor terminal. For example, the context indication information may be included in the probe request and association request transmitted and received in the link establishment procedure. The WUR capability element described above may include context indication information. Specifically, the context indication information may be indicated through one bit included in the probe request and association request transmitted and received in the link establishment procedure. Or more than two bits may be used for context indication information. For example, if the context includes mobility of the AP, more than two bits may be used to additionally indicate the degree of mobility (e.g., the average mobility rate) in addition to the mobility of the AP.

According to one embodiment, the context may include the mobility of the AP indicating whether the AP is mobile. The AP may transmit to the station the information indicating whether the AP is mobile or not. If a link is set with an AP that activates the mobility indication, a station operating in the WURx mode may determine the station's operation at the time point at which WUR beacon reception is stopped.

For example, a station transmitting data only when an AP request is received may maintain the WURx mode until the time point at which the WUR beacon of the AP is received again, and may not scan a new AP. For example, the fixed sensor terminals in the sensor network may operate in a manner of providing data to the AP only when a request is received from the AP as described above.

On the other hand, when the station using the data communication does not receive the WUR beacon even if the AP request is not received, in the WURx mode, the PCR transceiver may transition to a wake-up mode. In this case, the station may perform scanning for establishing a link with the AP through the PCR transceiver. For example, if a wireless communication terminal such as a smart phone or a laptop may not hear a WUR beacon from an existing AP, it may attempt scanning for a link establishment by waking up the PCR transceiver.

According to one embodiment, a mobility indication may also be utilized on the station side. A fixed terminal having no mobility such as a sensor terminal may transmit information indicating whether the mobility of the sensor mobile station is inactive to the AP through WUR-based operation related information. In this case, if the AP may not receive a response to the wake-up packet from the sensor terminal signaling that there is no mobility, the AP may determine that there is an error in the operation of the sensor terminal. This is because the AP does not receive a response from the sensor terminal located in the communicable area even though the mobility indication of the sensor terminal is inactivated. In this case, the AP may determine that a hardware error such as a battery discharge occurs in the sensor terminal.

According to one embodiment, the context may include WUR operation related information of the AP. For example, the context may include whether the AP is capable of the WURx mode. In order to reduce the AP's power consumption and performance degradation due to interference in relation to WUR-based power save, research is underway on APs that may operate in the WURx mode. If the AP is capable of operating in the WURx mode, the non-AP station may utilize information on the WURx mode availability of the AP.

For example, if the AP is operating in the WURx mode, the AP may not transmit WUR beacons. If a station operating in the WURx mode does not receive a signal that the AP enters the WURx mode, the station may not receive a WUR beacon from the AP at the beacon reception time. In this case, as described above, the station may attempt to scan for link establishment by waking up the PCR transceiver of the station. In this case, an AP operating in the WURx mode may not respond because it does not receive a probe request from the station. If a station having mobility identifies that the AP is capable of operating in the WURx mode, the station may determine that the connection is lost due to station mobility, or the AP is operating in the WURx mode. In this case, the station may transmit a wake-up packet to the AP to determine whether the AP is operating in the WURx mode. The station may maintain a connection state with the AP to receive a response to the AP's wake-up packet. For example, if an AP receives a wake-up packet and stops the WURx mode and wakes-up the PCR transceiver, the station may maintain the connection state with the AP. If the station does not receive a response from the AP within a predetermined time, the station may determine that the connection with the AP is lost due to the mobility of the station. In this case, the station may perform scanning for establishing a link with another AP.

Also, according to one embodiment, if the station is a fixed sensor terminal, the station may use the context indication information of the AP to identify that the AP is operating in the WURx mode. For example, if the mobility of the AP is deactivated and the WURx mode operation is activated, the station may identify that the AP is in the WURx mode. This is because the station and the AP have no mobility. If the mobility of the AP is deactivated and the WURx mode operation is activated, the station may maintain the WURx mode without waking up the PCR transceiver of the station.

Figure 17:
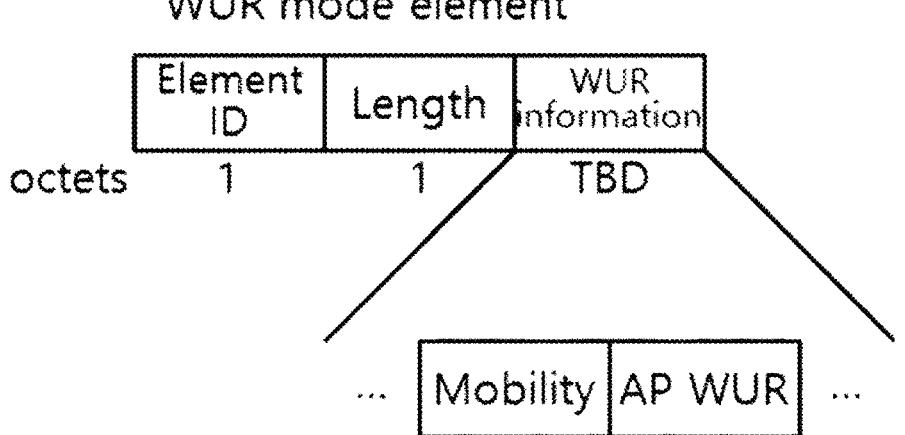
FIG. 17 shows a method of indicating a context of a WUR terminal according to another embodiment of the present disclosure.

FIG. 17 shows a method of indicating a context of a WUR terminal according to another embodiment of the present disclosure. The context indication described with reference to FIG. 16 may be included in the WUR mode element or the WUR capability element during the WUR negotiation procedure and exchanged between the station and the AP. If a station operating in the WURx mode establishes a link with an AP that activate the mobility indication, as described with reference to FIG. 16, the station may determine the subsequent operation of the station at the time point at which the WUR beacon reception is stopped.

Figure 18:
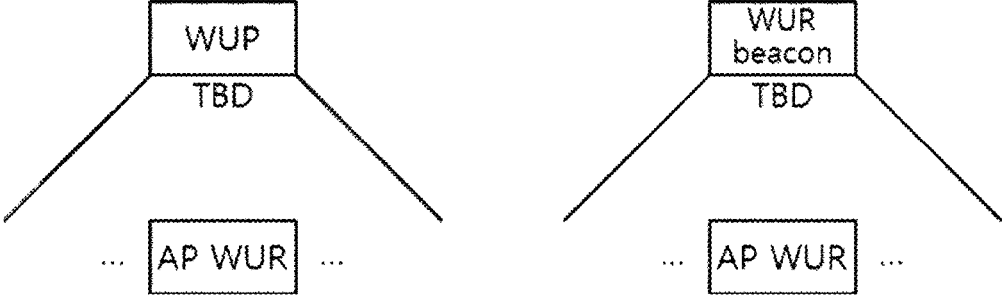
FIG. 18 shows a WUR mode indication method of an AP WUR capable AP according to another embodiment of the present disclosure.

FIG. 18 shows a WURx mode indication method of an AP capable of operating in the WURx mode according to another embodiment of the present disclosure.

When the AP operates in the WURx mode as described with reference to FIGS. 16 and 17, the station connected to the AP may not recognize the WURx mode operation possibility of the AP. A non-AP station may enter the WURx mode after receiving a response frame such as an immediate response by transmitting a WURx mode request to the connected AP. In this case, the immediate response may indicate that a response to a certain frame is transmitted at predetermined intervals. The predetermined interval may be an SIFS. When the number of stations set with a link with an AP is a plurality of wireless communication terminals, it may be inefficient to transmit and receive a WURx mode request and a response frame to all stations to which the wireless communication terminal is connected. For example, if an AP transmits a WURx mode request as a broadcast, some stations may not successfully receive the WURx mode request of the AP. For example, some stations operating in the WURx mode among the plurality of stations may not receive the WURx mode request of the AP.

Thus, the AP may broadcast a WURx mode request a plurality of times to a plurality of stations included in the BSS before entering the WURx mode. Or the AP may insert information indicating that the AP enters the WURx mode into the wake-up packet or the WUR beacon. Or, the AP may broadcast to the station a wake-up packet or a WUR beacon including information indicating that the AP enters the WURx mode. The AP may transmit to the station operating in the WURx mode the fact that it will operate in the WURx mode based on the WUR signal.

A station operating in the WURx mode may receive a wake-up packet or a WUR beacon including information indicating that the AP enters the WURx mode. In this case, the station may transmit the awake frame through the PCR transceiver after performing the wake-up if there is uplink data to be transmitted. The AP may wait for reception of an awake frame transmitted from any of the stations operating in the WURx mode during the wake-up delay of the station operating in the WURx mode. Further, if the AP fails to receive an awake frame within the wake-up delay of the station operating in the WURx mode, the AP may enter the WURx mode.

Meanwhile, according to one embodiment, the WUR operation related information of the AP may be indicated through the WUR beacon interval field included in the WUR beacon. For example, if the period of the WUR beacon included in the WUR beacon is 0 or a predetermined maximum value, the station may identify that the AP is operating in WURx mode from the time point at which the station receives the WUR beacon. If the beacon period field of the WUR beacon is 0 or a predetermined maximum value, the station may identify that the WUR beacon may not be transmitted from the AP. When the AP finishes the WURx mode operation, the AP may readjust the WUR beacon period.

When the AP is operating in the WURx mode, the station may determine an operation method when the WUR beacon is not received, as a suggested method in relation to the context indication in FIG. 16.

Meanwhile, according to an embodiment, the AP may transmit a WUR beacon by waking up the transceiver of the AP every predetermined WUR beacon period while operating in the WURx mode. Specifically, when the PCR transceiver is in a doze state, the AP may transmit the WUR beacon by waking up the PCR transceiver of the AP every predetermined WUR beacon period. In this case, the AP may set the WUR beacon period to a longer time than when the PCR is not in the doze state. The AP may transmit the changed WUR beacon period to the station. Through these embodiments, the AP may prevent the station from failing to receive the WUR beacon.

The AP may transmit a WUR beacon including information on the WUR beacon period change to the station operating in the WURx mode. In this case, the AP may directly indicate the WUR beacon period. Alternatively, the AP may be indicated by a symbol representing a WUR beacon period. Alternatively, the AP may indicate the WUR beacon period with the number of sections having a predetermined duration. In this case, the AP may signal how many intervals are increased or decreased compared to the previous WUR beacon period according to the changed WUR beacon period. In this case, a station operating in the WURx mode and the duty cycle mode may determine the time section for maintaining WURx of the station to be in an active state in order for WUR beacon reception based on the change in the WUR beacon period signaled by the AP. A station operating in the WURx mode and the duty cycle mode may maintain WURx to be in an active state at least until a determined time section.

The above-mentioned description of the present disclosure is for illustrative purposes only, and it will be understood that those of ordinary skill in the art to which the present disclosure belongs may make changes to the present disclosure without altering the technical ideas or essential characteristics of the present disclosure and the invention may be easily modified in other specific forms. Therefore, the embodiments described above are illustrative and are not restricted in all aspects. For example, each component described as a single entity may be distributed and implemented, and likewise, components described as being distributed may also be implemented in a combined form.

The scope of the present disclosure is defined by the appended claims rather than the above detailed description, and all changes or modifications derived from the meaning and range of the appended claims and equivalents thereof are to be interpreted as being included within the scope of present disclosure.

What is claimed is:

1. A wireless communication terminal communicating wirelessly with a base wireless communication terminal, the terminal comprising:

a processor, wherein the processor is configured to:

receive a trigger frame for switching an operation mode from a first operation mode to a second operation mode from the base wireless communication terminal, wherein the wireless communication terminal receives only a PPDU which has a predetermined format and is transmitted by a predetermined modulation method in the first operation mode, and receives a PPDU other than the PPDU which has the predetermined format and is transmitted by the predetermined modulation method in the second operation mode, switch, based on the trigger frame, the first operation mode to the second operation mode, transmit an initial frame in response to the trigger frame in the second operation mode, and determine whether to switch back to the first operation mode based on receiving a subsequent frame subsequent to the initial frame within a timeout interval, wherein the timeout interval is a time interval from a time point when the initial frame is transmitted to a time point when a predetermined time elapses from the time point when the initial frame is transmitted.

2. The wireless communication terminal of claim 1, wherein the processor is configured to switch back to the first operation mode when the wireless communication terminal does not receive the subsequent frame within the timeout interval.

3. The wireless communication terminal of claim 1, wherein a time point when the wireless communication terminal switches back to the first operation mode is determined based on a transition delay which represents a delay required for switching the operation mode from the second operation mode to the first operation mode.

4. The wireless communication terminal of claim 3, wherein the processor is configured to transmit information on the transition delay to the base wireless communication terminal when a link between the wireless communication terminal and the base wireless communication terminal is established.

5. The wireless communication terminal of claim 1, wherein an inter-frame space between the trigger frame and the initial frame is a short inter-frame space.

6. A method of operating a wireless communication terminal communicating wirelessly with a base wireless communication terminal, the method comprising:

receiving a trigger frame for switching an operation mode from a first operation mode to a second operation mode from the base wireless communication terminal, wherein the wireless communication terminal receives only a PPDU which has a predetermined format and is transmitted by a predetermined modulation method in the first operation mode, and receives a PPDU other than the PPDU which has the predetermined format and is transmitted by the predetermined modulation method in the second operation mode, switching, based on the trigger frame, the first operation mode to the second operation mode, transmitting an initial frame in response to the trigger frame in the second operation mode, and determining whether to switch back to the first operation mode based on receiving a subsequent frame subsequent to the initial frame within a timeout interval, wherein the timeout interval is a time interval from a time point when the initial frame is transmitted to a time point when a predetermined time elapses from the time point when the initial frame is transmitted.

7. The method of claim 6, wherein the method further comprises switching back to the first operation mode when the wireless communication terminal does not receive the subsequent frame within the timeout interval.

8. The method of claim 6, wherein a time when the wireless communication terminal switches back to the first operation mode is determined based on a transition delay which represents a delay required for switching the operation mode from the second operation mode to the first operation mode.

9. The method of claim 8, wherein the method further comprises transmitting information on the transition delay to the base wireless communication terminal when a link between the wireless communication terminal and the base wireless communication terminal is established.

10. The method of claim 6, wherein an inter-frame space between the trigger frame and the initial frame is a short inter-frame space.

* * * * *